United States Patent
Nordenfelt et al.

(10) Patent No.: US 10,073,165 B2
(45) Date of Patent: Sep. 11, 2018

(54) DISTANCE MEASUREMENT INSTRUMENT WITH SCANNING FUNCTION

(71) Applicant: TRIMBLE AB, Danderyd (SE)

(72) Inventors: Mikael Nordenfelt, Bergshamra (SE); Mikael Hertzman, Sollentuna (SE)

(73) Assignee: Trimble AB, Danderyd (SE)

(*) Notice: Subject to any disclaimer, the term of this patent is extended or adjusted under 35 U.S.C. 154(b) by 329 days.

(21) Appl. No.: 14/872,472

(22) Filed: Oct. 1, 2015

(65) Prior Publication Data
US 2016/0131745 A1 May 12, 2016

(30) Foreign Application Priority Data
Nov. 12, 2014 (EP) .................................. 14192800

(51) Int. Cl.
| | |
|---|---|
| G01S 7/48 | (2006.01) |
| G01S 7/481 | (2006.01) |
| G01S 17/08 | (2006.01) |
| G01C 15/00 | (2006.01) |

(52) U.S. Cl.
CPC .......... G01S 7/4817 (2013.01); G01C 15/002 (2013.01); G01S 17/08 (2013.01)

(58) Field of Classification Search
CPC .... G01S 7/4812; G01S 7/4813; G01S 7/4817; G01S 7/499; G01S 17/66; G01S 17/42; G01S 17/936; G02B 26/101; G02B 26/0875
See application file for complete search history.

(56) References Cited

U.S. PATENT DOCUMENTS

| | | | |
|---|---|---|---|
| 2006/0158423 A1 | 7/2006 | Kern et al. | |
| 2007/0103698 A1* | 5/2007 | Liu | G01B 11/14 356/620 |
| 2007/0138371 A1 | 6/2007 | Marshall | |
| 2009/0059766 A1* | 3/2009 | Yamada | G01S 7/4812 369/112.01 |
| 2009/0138233 A1* | 5/2009 | Kludas | G01C 15/00 702/158 |
| 2012/0224164 A1 | 9/2012 | Hayashi et al. | |
| 2014/0307252 A1 | 10/2014 | Hinderling et al. | |

FOREIGN PATENT DOCUMENTS

| | | |
|---|---|---|
| CN | 101153795 A | 4/2008 |
| CN | 104081157 A | 10/2014 |
| WO | 99/26214 A1 | 5/1999 |

OTHER PUBLICATIONS

European Search Report for European Patent Application No. EP 14192800.2-1557, dated May 19, 2015, 8 pages.

* cited by examiner

Primary Examiner — Luke D Ratcliffe
(74) Attorney, Agent, or Firm — Kilpatrick Townsend and Stockton

(57) ABSTRACT

A measurement instrument is disclosed. The measurement instrument comprises a distance measurement module, a splitter and a deflection module. The distance measurement module is configured to transmit optical radiation along a transmit path and receive optical radiation along a receive path. The transmit path and the receive path are merged in a measurement beam at the splitter. The deflection module is located optically between the distance measurement module and the splitter. The deflection module is configured to aim the transmit path and the receive path at the splitter and to deflect at least one of the transmit path and the receive path across an instrument optical axis.

16 Claims, 24 Drawing Sheets

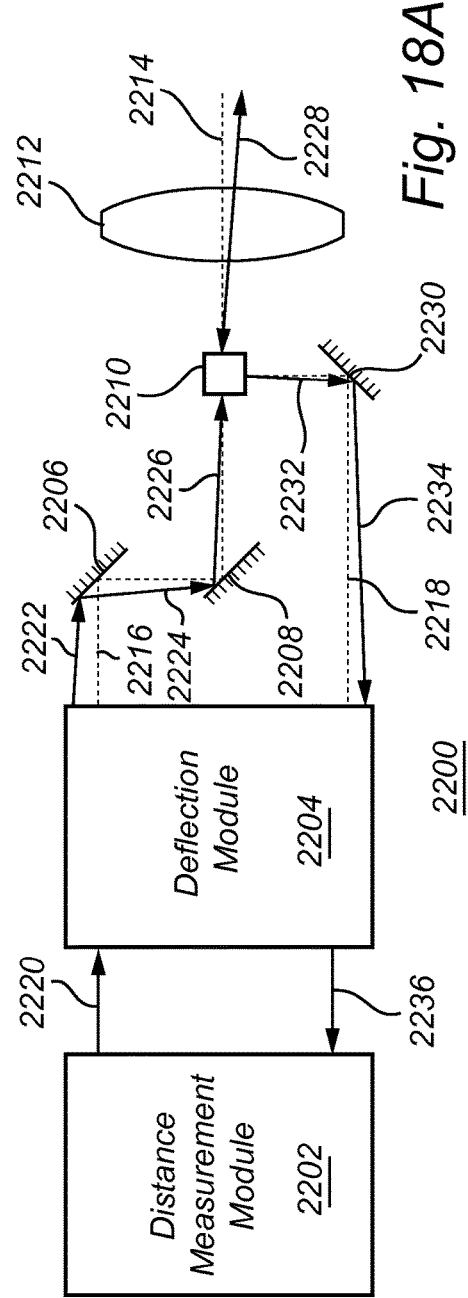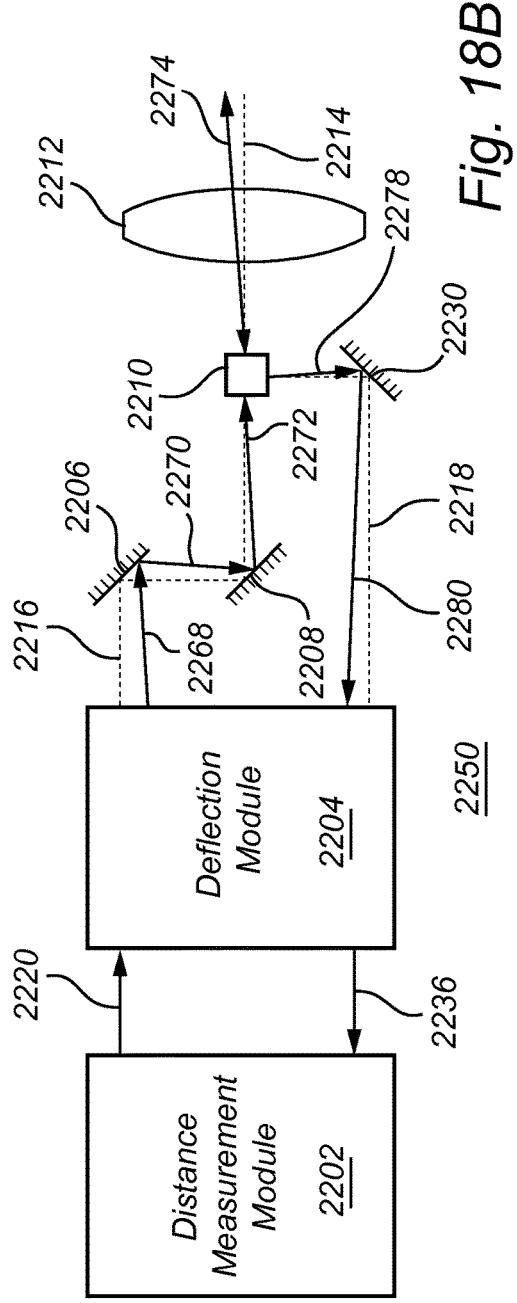

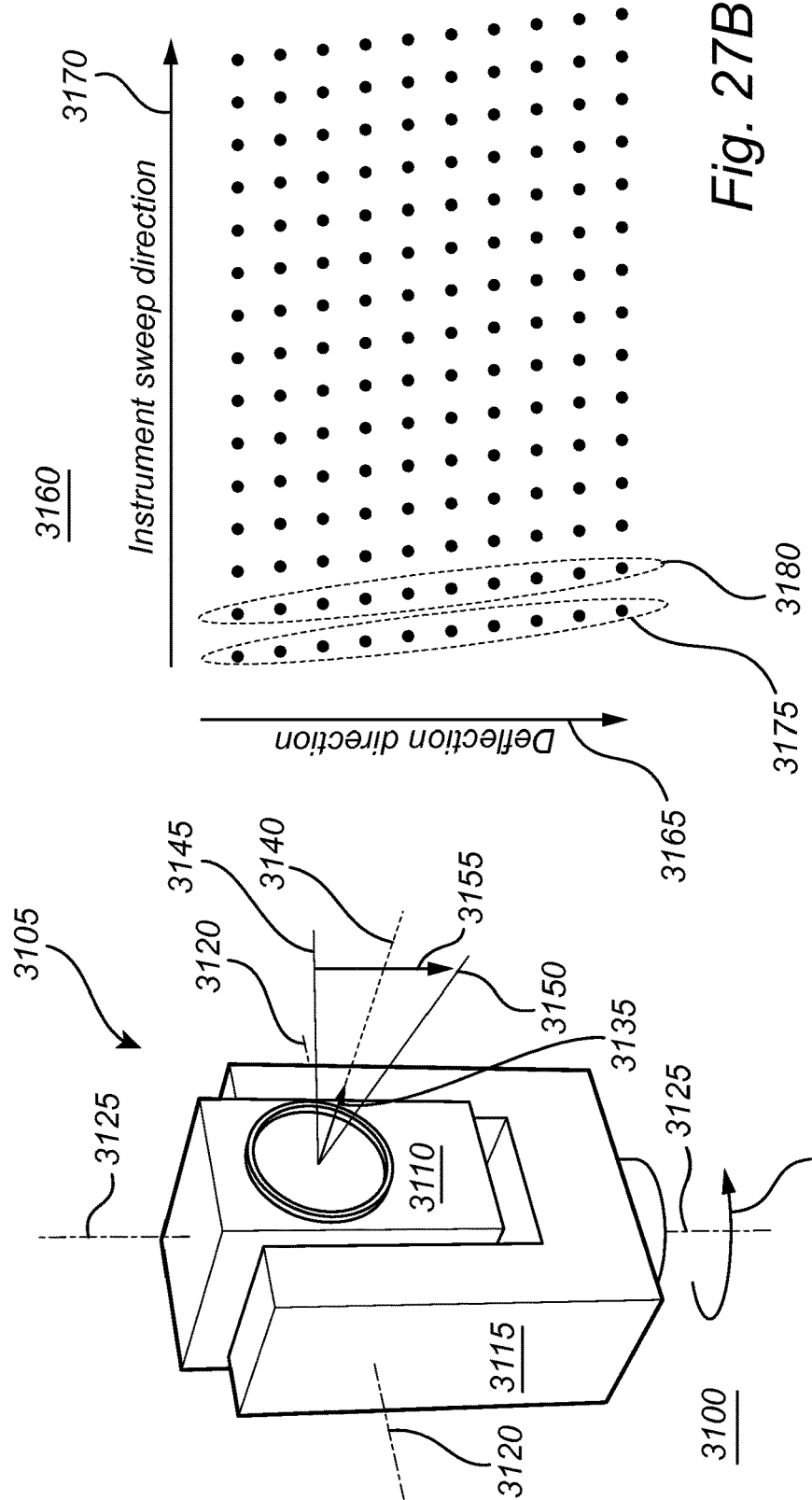

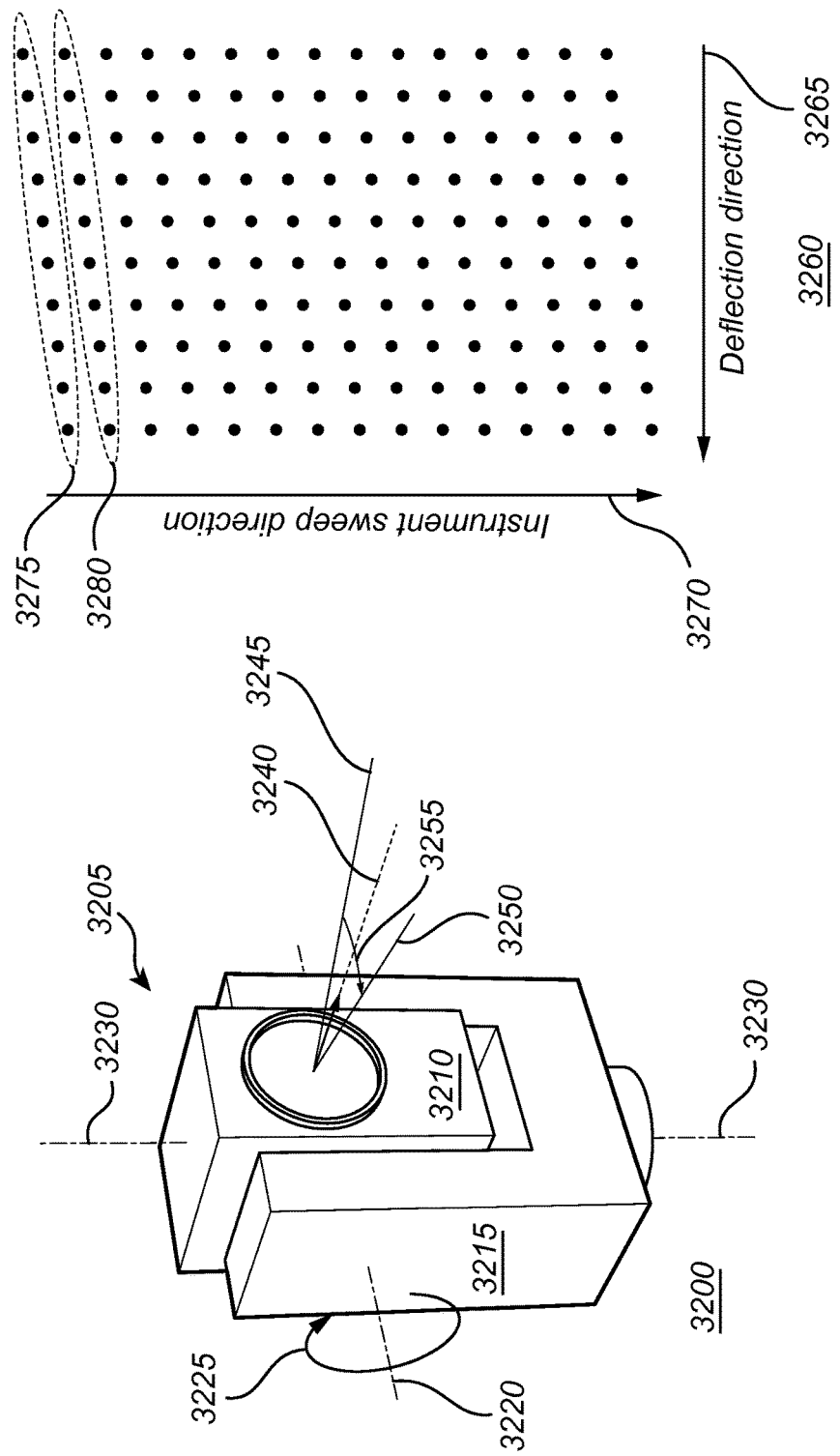

DISTANCE MEASUREMENT INSTRUMENT WITH SCANNING FUNCTION

CROSS-REFERENCE TO RELATED APPLICATIONS

This application claims priority to European Application No. 14192800.2, filed Nov. 12, 2014, the entire contents of which are incorporated herein by reference in their entirety for all purposes.

TECHNICAL FIELD

The present disclosure relates to the field of electronic distance measurement. More particularly, the present disclosure relates to distance measurement with deflection of optical radiation.

BACKGROUND ART

FIG. 1 schematically illustrates a typical prior-art scenario 100 of a surveyor 105 using a cooperative target 110 with a robotic total station 115 mounted on a tripod 120. The robotic total station 115 can also be used with non-cooperative targets to measure their positions. The robotic total station 115 has a telescope with a coaxial electronic-distance measurement (EDM) system for measuring a distance 125 to the target 110. The robotic total station may be remotely controlled via a communication channel 130. The telescope is aimed by rotation in a vertical direction 135 about a first axis (not shown in FIG. 1) and azimuthally about a second axis 140.

The elevation and azimuth of the telescope are recorded along with the distance measurement when the telescope axis is aimed at a target location. The optical axis of the telescope and EDM is rotated about one or both of the rotation axes to shift from one target location to another.

FIG. 2 schematically illustrates a typical prior-art scenario 200 of a 3D laser scanner 205 mounted on a tripod 210 for taking measurements of a scene such as a building 215 and surroundings 220 to obtain a 3D cloud of measured points over vertical and azimuthal angular limits indicated by dashed lines 225, 230, 235, 240. The scanner 205 typically has a rotating mirror to scan the optical axis of the instrument (i.e. the EDM axis) at a high speed in a vertical direction 245. The rotating mirror is mounted on a scan head rotating azimuthally about an axis 250 at low speed.

The EDM of the scanner 205 is free-running at a high repetition rate, and is not aimed at specific target locations. The elevation and azimuth of the telescope are recorded along with each distance measurement.

The azimuth angle, elevation angle and distance measurements of the scanner 205 are not as precise as those of a total station such as the total station 115 of FIG. 1, and the EDM beam is not aimed at specific target locations. The total station 115 has the advantage of greater measurement precision than the scanner 205, while the scanner 205 has the advantage of acquiring point measurements at a much higher repetition rate than the total station 115.

FIG. 3 schematically illustrates a prior-art scenario 300 of a surveyor 305 using a target 310 with a robotic total station 315 mounted on a tripod 320. In a first mode, the surveyor 305 may use the total station 315 to perform distance measurements to the specific target 310 mounted on a pole hold by the surveyor 305, as already illustrated in FIG. 1. In a second mode (or scanning mode), the total station 315 may be used to acquire a 3D cloud of point measurements of a scene such as a building 325 and surroundings 330. Dashed lines 335, 340, 345, 350 indicate the vertical and azimuthal angular limits of the measurement when the total station 315 is used in this second, scanning mode. Acquiring a dense cloud of point measurements with a total station as in FIG. 3 is usually slow and cumbersome, as the telescope must be repositioned for each measured point.

Another type of prior-art scanning total station may have the telescope rotating continuously while distance measurements are acquired at a fairly high rate (about 1000 Hz). This design is still limited by the large inertia of the telescope.

SUMMARY

The present disclosure seeks to provide at least some embodiments of measuring instruments which overcome at least some of the above mentioned drawbacks. More specifically, the present disclosure aims at providing at least some embodiments offering the measurement precision of a total station and the capability of acquiring a dense cloud of point measurements at a much higher repetition rate than a total station.

To achieve this, a measuring instrument having the features as defined in the independent claim is provided. Further advantageous embodiments of the present disclosure are defined in the dependent claims.

According to some embodiments, a measurement instrument comprises a distance measurement module, a splitter and a deflection module. The distance measurement module is configured to transmit optical radiation along a transmit path and receive optical radiation along a receive path. The transmit path and the receive path are merged in a measurement beam at the splitter. The deflection module is located optically between the distance measurement module and the splitter. The deflection module is configured to aim the transmit path and the receive path at the splitter and to deflect at least one of the transmit path and the receive path across an instrument optical axis.

In these embodiments, the deflection module is arranged between the distance measurement module (or EDM) and the splitter. The instrument may provide both measurements as a total station, i.e. with the precision of a total station when performing distance measurement to a specific target, and scanning of a scene with measurements performed at a repetition rate similar to that of a geodetic scanner.

In these embodiments, the splitter may be considered to act as a mixer in that the transmit path and the receive path are merged together to form a measurement beam from the instrument to the target, or scene, to which distance measurements are to be performed. The splitter may be defined to have a splitting point at which the deflection module is configured to aim the transmit path and the receive path. The splitting point may then be considered to correspond to a mixing point. Thus, although it is in the present disclosure often referred to a splitter having a splitting point, the embodiments may also be described by referring to a mixer having a mixing point instead.

While the splitter (or mixer) separates the measurement beam into a transmit path and a receive path within the instrument, i.e. from the splitter/mixer to the distance measurement module, the splitter (or mixer) directs the transmit path and the receive path within a common measurement beam extending from the splitter/mixer to the target. It will be appreciated that the overlapping of the transmitted signal (e.g. an optical pulse emitted from the EDM of the instrument) and the received signal (e.g. light reflected at a target and directed toward the EDM of the instrument) from the splitter (or from a splitting point or mixing point of the splitter) out of the instrument forms the measurement beam. It will also be appreciated that, the transmit path and the receive path may already overlap within the instrument, for instance in a configuration wherein the splitter (or mixer) is arranged in the optical path between the distance measurement module and a front lens (or other optical element) of the instrument. In other words, a segment of the transmit path from the splitter (or splitting point of the splitter) through a front lens along an optical path towards a target may overlap a segment of the receive path from the target along the optical path through the front lens to the splitter (or splitting point of the splitter). The combination of these overlapping segments of the transmit path and the receive path forms at least part of the measurement beam.

In general, the distance measurement module is a module configured to perform distance measurements for determining a distance from the instrument to a target or to other elements (or points) of a scene. The distance measurement module may for example be an electronic distance measurement (EDM) system. A distance measurement module may include a transmitter for transmitting optical radiation (or an optical pulse) toward a target or scene (e.g. a building) along the transmit path and a receiver for receiving optical radiation reflected at the target or elements of a scene (e.g. a reflected optical pulse) along the receive path. The distance may for example be calculated based on time of flight measurements.

In these embodiments, the deflection is performed separately on the transmit path and the receive path before (as seen from the transmitter along the transmit path) and after (as seen from the receiver along the receive path) they are combined into a measurement beam.

In accordance with some embodiments, a deflection module may be inserted in the optical path between the distance measurement module and the splitter of the measurement instrument. The measurement instrument may be a total station such that, in a first mode, measurements may be performed with the deflection module being still wherein the instrument aims at a specific target by rotation/movement of at least some parts of the body such as its center unit or alidade. In this first mode, parts of the body of the instrument are moved such that the instrument optical axis is directed towards the target. In a second mode, the measurement instrument may be operated to perform scanning of a scene (including e.g. a building) by deflecting at least one of the transmit path and the receive path of the instrument across the instrument optical axis via the deflection module.

According to an embodiment, the deflection module may comprise at least one deflection element mounted for rotational motion such that the measurement path is deflected with rotation of the deflection element. Alternatively, the deflection module may comprise at least one deflection element mounted for translational displacement such that the measurement path is deflected with translational displacement of the deflection element.

According to an embodiment, the instrument may further comprise a drive element operative to rotate the at least one deflection element or to translate the at least one deflection element. Accordingly, the drive element may be operative to produce an oscillating rotational motion of the at least one deflection element. For at least these purposes, the drive element may comprise a three-phase motor or a direct-current motor.

Alternatively, the drive element may be operative to produce a continuous rotational motion of the at least one deflection element. For at least this purpose, the drive element may comprise at least one motor having constant rotational speed. According to yet a further alternative, the drive element may be operative to produce a directed rotational motion of the at least one deflection element to a selected orientation.

Generally, the instrument (or the drive element of the instrument) may be equipped with a piezoelectric element for providing a rotation or a translational displacement of the at least one deflection element.

According to an embodiment, the instrument may further comprise an angle sensor or a linear sensor operative to detect an angle of rotation of the at least one deflection element. For example, the angle sensor may be an angle encoder. Alternatively or additionally, the instrument may be equipped with a displacement sensor operative to detect a translational displacement of the at least one deflection element.

According to an embodiment, the instrument may further comprise a drive controller operative to control rotational motion and/or translational displacement of the at least one deflection element by the drive element.

According to an embodiment, the drive controller may be responsive to an angle sensor and/or a displacement sensor to control the drive element in dependence upon a rotation angle and/or a translational displacement, respectively, of the at least one deflection element.

According to an embodiment, the at least one deflection element may comprise at least one of a prism, a multi-faceted mirror and a disk having a scalloped curving mirrored surface. The prism may have any number of faces and the multi-faceted mirror may have any number of facets. For exemplifying purposes only, the at least one deflection element may be a prism having six to ten faces distributed around an axis of rotation.

According to an embodiment, the at least one deflection element may be a disk having a scalloped curving mirrored surface shaped to provide linear deflection of the measurement path when rotated at a constant velocity. According to another embodiment, the scalloped curving mirrored surface may be shaped to provide nonlinear deflection of the measurement path when rotated at a constant velocity.

According to an embodiment, the instrument may further comprise a deflection lens assembly in the transmit path. The deflection module may be operative to displace the transmit path, whereby a displacement of the transmit path is converted to angular deflection across the optical axis by the deflection lens assembly. The deflection lens assembly may be part of the deflection module or a separate entity. The deflection lens assembly operates together with a deflection element of the deflection module to transform a motion of the deflection element into an angular deflection.

According to another embodiment, the instrument may further comprise a deflection lens assembly in the receive path. The deflection module may be operative to displace the receive path, whereby a displacement of the receive path is converted to angular deflection across the optical axis by the deflection lens assembly.

In some embodiments, the instrument may further comprise a front lens assembly having an optical axis, thereby creating a focal point of the instrument at a certain distance from the front lens. The splitter (or splitting point of the splitter) may then lie along the optical axis of the front lens assembly between the front lens assembly (or a rear lens surface of the front lens assembly) and a deflection element of the deflection module at a distance from the front lens assembly (or the rear lens surface) of less than the distance to the focal point. It will be appreciated that the front lens assembly may be configured to, in combination with other optical elements of the measurement instrument, focus the light beam (i.e. light propagating along the transmit path and/or the receive path) at a focal point which is referred to as the focal point of the instrument. Further, it will be appreciated that the front lens assembly may in general be distinct from any deflection lens assembly of the deflection module used for transforming a motion of a deflection element into an angular deflection.

In general, the front lens assembly is, in the transmit path, the optical group (or assembly) which includes the last optical element with a certain refractive property or effect (e.g. a diverging/converging lens) at which, or after which, the measurement beam exits (or leaves) the measurement instrument. Analogously, the front lens assembly is the optical group (or assembly) which includes the first optical element with a certain refractive property (e.g. a diverging/converging lens) which the measurement beam meets when entering, or after having entered, the measurement instrument. The front lens assembly of the instrument may for example be a lens.

In some embodiments, the distance measurement module may comprise an optical detector in the receive path, located approximately at the focal point of the instrument along the receive path. Further, the distance measurement module may comprise an optical transmitter in the transmit path, located approximately at the focal point of the instrument from the front lens assembly along the transmit path.

It will be appreciated that the instrument may further comprise a target tracker and a servo module. The target tracker may have a detection module operative to distinguish at least one specific target in the vicinity of the measurement instrument from other targets. The servo module may be configured to be responsive to the target tracker to aim the instrument optical axis such that the specific target is within a field of view of the distance measurement module.

Further, the instrument may comprise a camera. The camera may for example be operative to acquire at least one of still images and video images. Further, the camera may have a camera optical axis which is coaxial with the instrument optical axis. The camera may then be operative to acquire images useful for controlling the servo module to aim the instrument optical axis.

Further, the instrument may comprise an optical eyepiece module which has an eyepiece optical axis being coaxial with the instrument optical axis.

According to an embodiment, the distance measurement module may comprise an optical transmission point and an optical reception point. Further, the instrument may comprise a center unit, an alidade, and a base, wherein the optical transmission point, the optical reception point, the splitter (or splitting point of the splitter) and the deflection module are located in the center unit. The center unit may be mounted on the alidade for rotation about a first axis, and the alidade may be mounted on the base for rotation about a second axis intersecting (e.g. orthogonal to) the first axis, such that the instrument optical axis is rotatable about a rotation point.

In some embodiments, the splitter (or mixer) may comprise a partially reflective surface through which optical radiation transmitted from the distance measurement module passes along the transmit path. The partially reflective surface may be arranged to reflect optical radiation arriving at the distance measurement module via the receive path which is distinct from the transmit path. Further, the splitter (or mixer) may comprise a partially reflective surface through which passes the optical radiation arriving via the receive path, and which reflects optical radiation transmitted along the transmit path.

In some embodiments, the partially reflective surface of the splitter (mixer) may be within a beam-splitter prism or a surface of an optical element.

According to an embodiment, the distance measurement module may be operated at a controlled repetition rate to acquire a sequence of distance measurements, the deflection module may be operated at a controlled deflection rate, and a deflection plane may be oriented such that a sweep of the instrument optical axis at a given velocity about one of the first axis and the second axis enables acquisition of the sequence of distance measurements spaced apart in a two-dimensional polar grid. The controlled repetition rate, the controlled deflection rate and the given velocity may for example be selected to obtain distance measurements having similar angular spacing in two dimensions of the polar grid.

According to another embodiment, the controlled deflection rate may be nonlinear and the controlled repetition rate may be varied to obtain a selected angular spacing between distance measurements.

According to an embodiment, the instrument may further comprise a first controllable drive for rotating the center unit about the first axis, a second controllable drive for rotating the alidade about the second axis, and a synchronizer. In the present embodiment, the synchronizer may be configured to operate one of the first controllable drive, the second controllable drive, the deflection module and the distance measurement unit so as to obtain a grid of distance measurements having a selected angular spacing.

It will be appreciated that the deflection module may be operative to deflect the measurement path in a deflection plane. For example, the deflection plane may include the instrument optical axis and may lie at an oblique angle to a plane defined by the instrument optical axis and the first axis. In particular, the oblique angle may be between 30 degrees and 60 degrees. Alternatively, the deflection plane may coincide with a plane defined by the instrument optical axis and the first axis. As another alternative, the deflection plane may be orthogonal to a plane defined by the instrument optical axis and the first axis.

In the context of the present application, the wording measurement instrument may be interchangeably replaced with the terms total station, survey unit, surveying instrument or geodetic instrument and vice versa. The present disclosure aims at providing at least some embodiments of a measurement instrument which functions as a total station, i.e. with the characteristic and the structure of a total station, but equipped with elements, and in particular a deflection module, for providing a scanning function such as obtained with a geodetic scanner.

The present disclosure relates to all possible combinations of features recited in the claims and in the preceding embodiments. Further objects and advantages of the various embodiments of the present disclosure will be described below by means of exemplifying embodiments.

BRIEF DESCRIPTION OF DRAWING FIGURES

These and other aspects and features of the present disclosure will be more readily understood from the embodiments described below with reference to the drawings, in which:

FIG. 1 schematically illustrates a prior-art scenario of a surveyor using a cooperative target with a robotic total station;

FIG. 2 schematically illustrates a prior-art scenario of a scanner on a tripod taking measurements of a scene;

FIG. 3 schematically illustrates a prior-art scenario of a surveyor using a robotic total station to acquire a 3D cloud of point measurements of a scene;

FIG. 4A, FIG. 4B and FIG. 4C schematically illustrate a measurement instrument in accordance with some embodiments;

Figure 6:
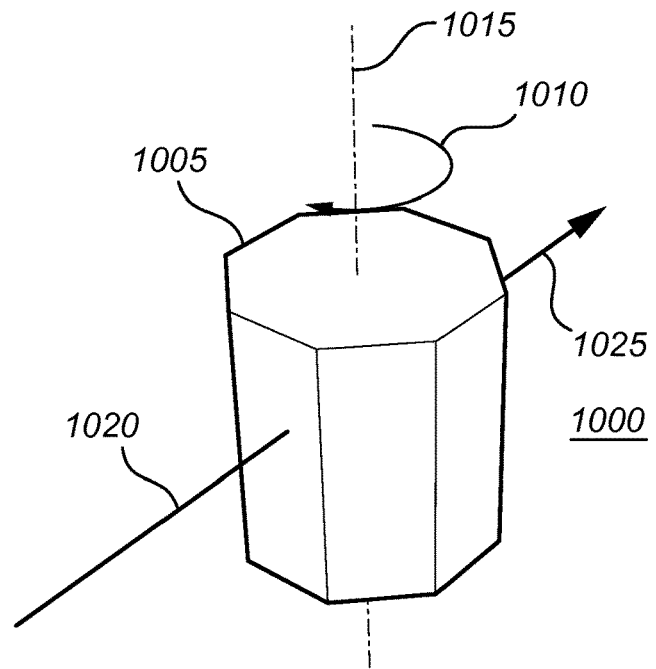
FIG. 6 illustrates a deflection element in accordance with some embodiments.
Figure 8A:
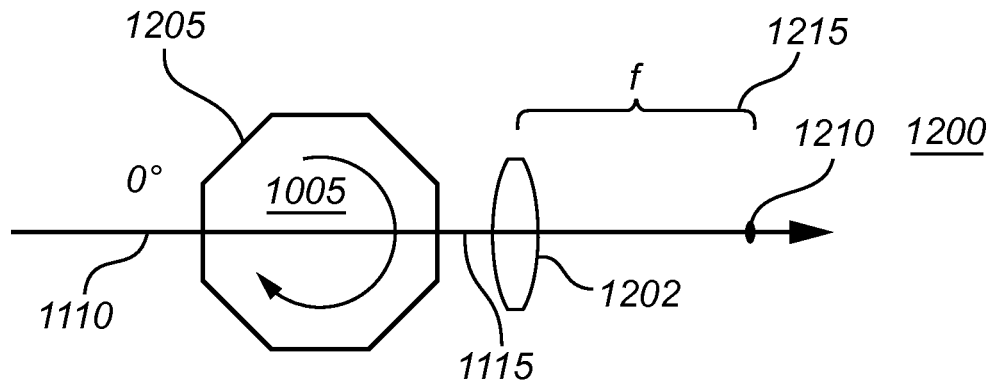
Figure 8B:
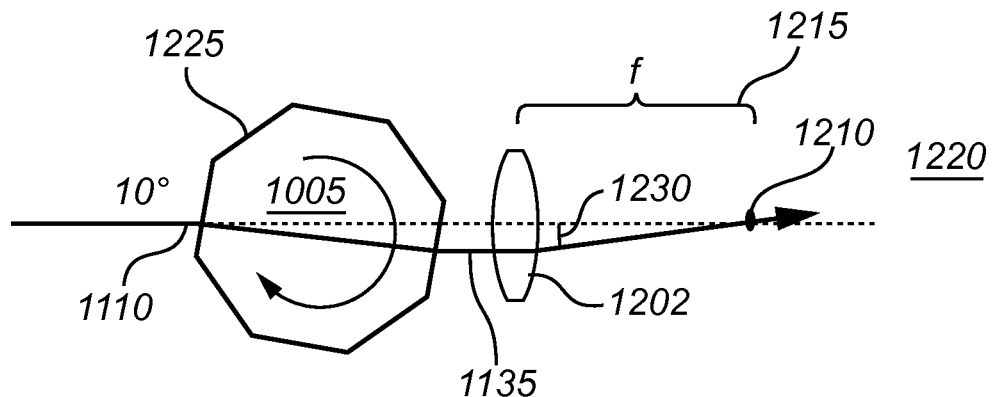
Figure 8C:
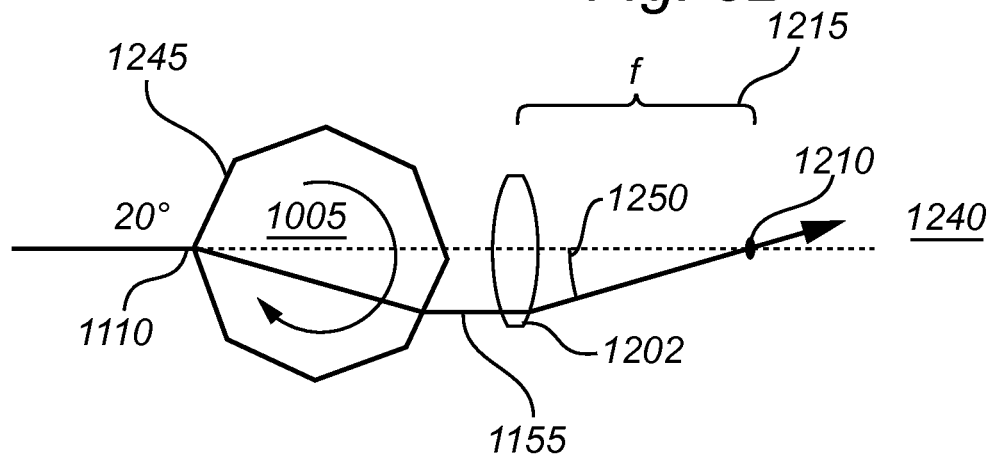
Figure 9:
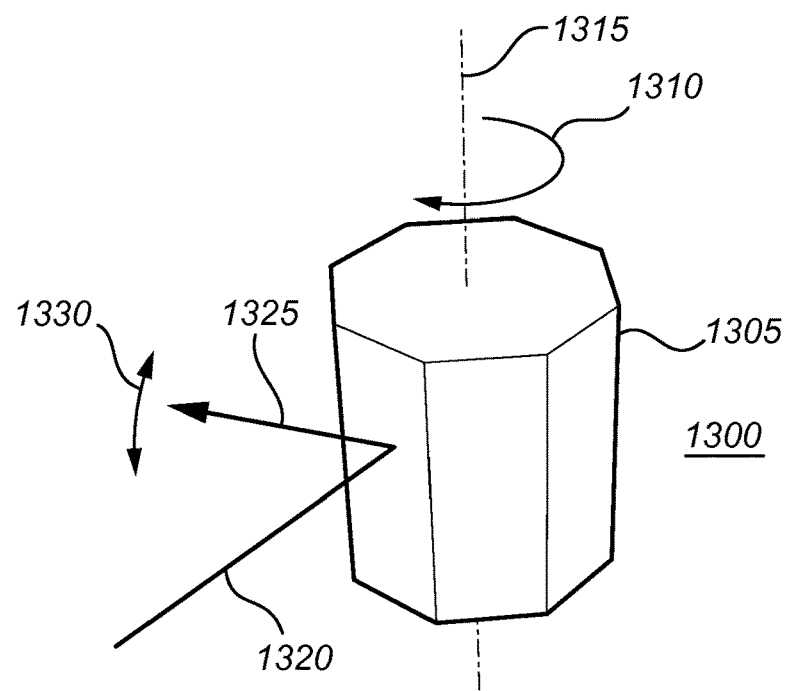
Figure 10:
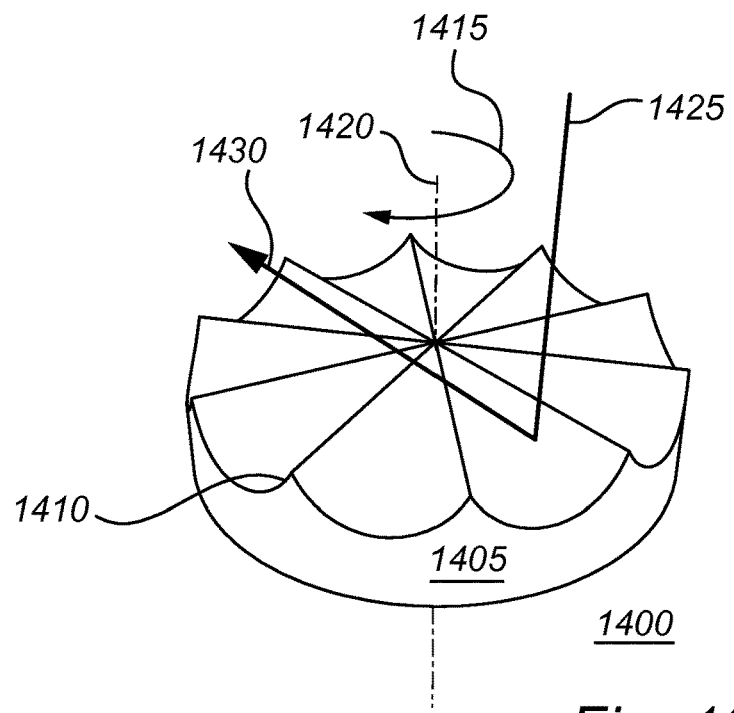
Figure 11A:
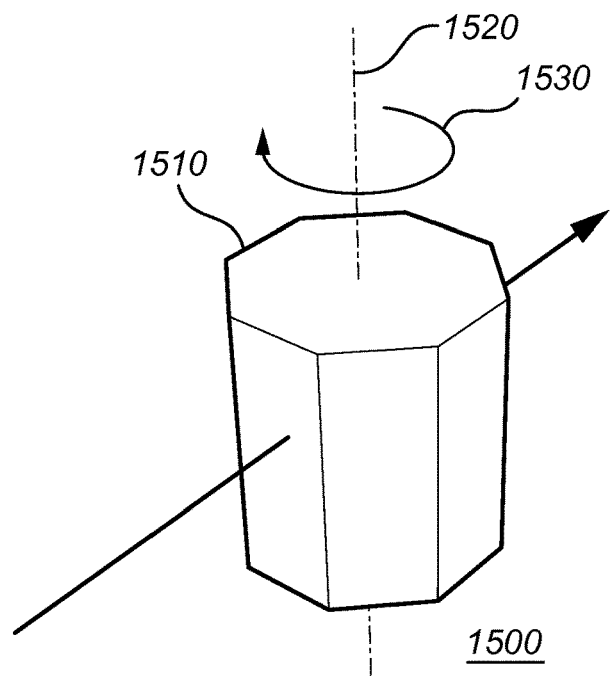
Figure 11B:
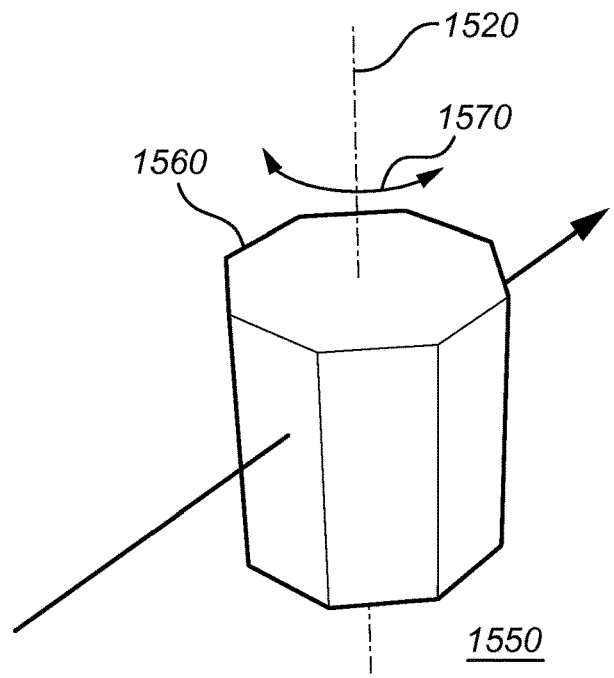
Figure 12A:
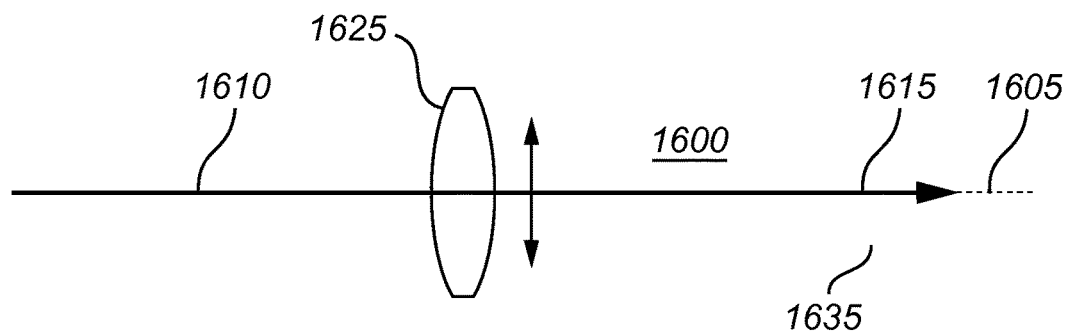
Figure 12B:
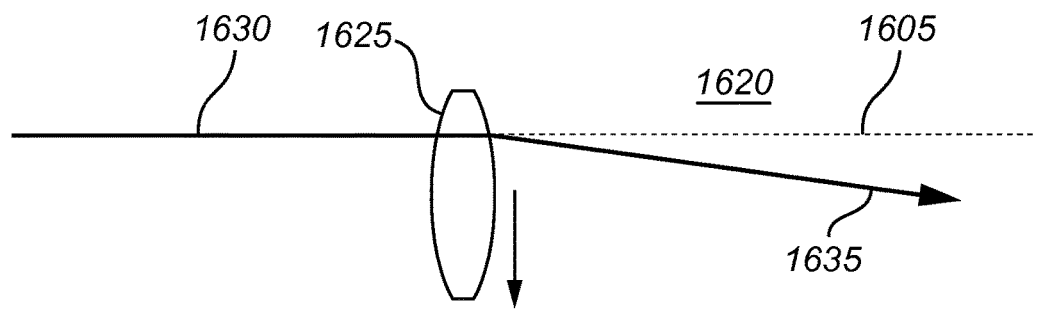
Figure 12C:
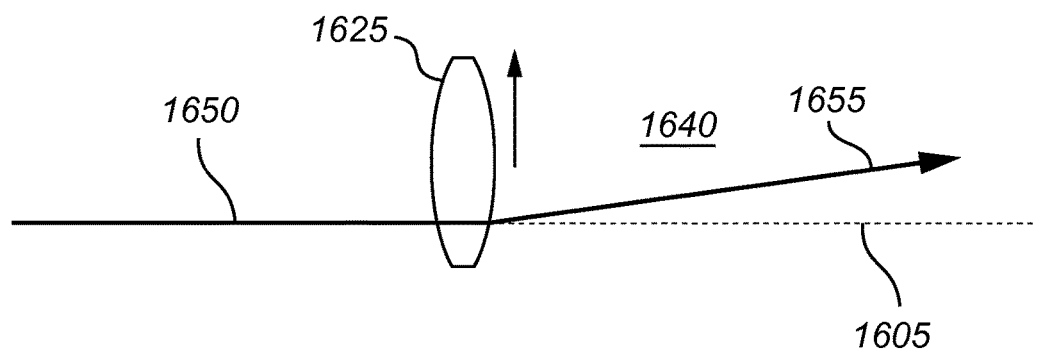
Figure 13A:
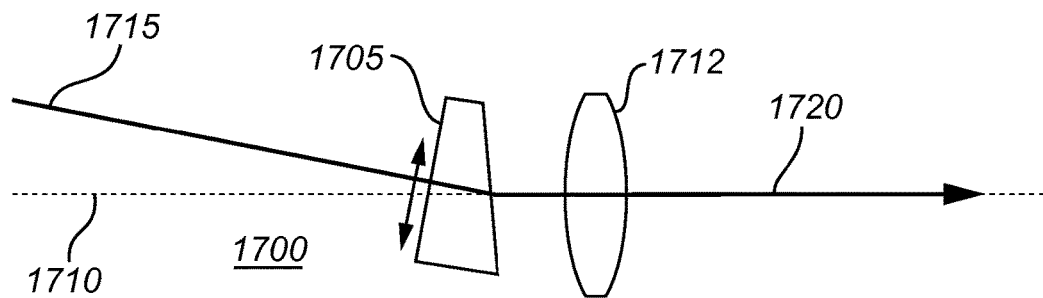
Figure 13B:
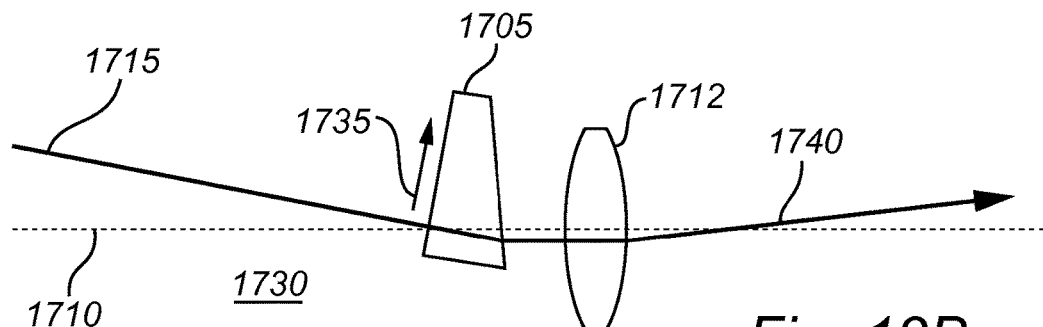
Figure 13C:
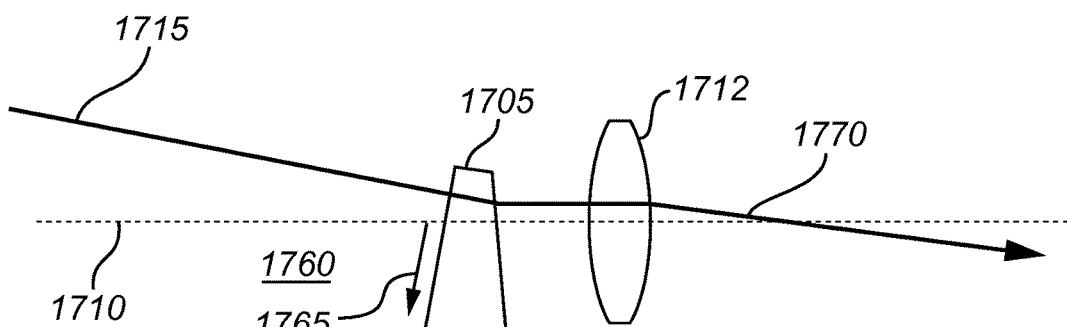
Figure 14:
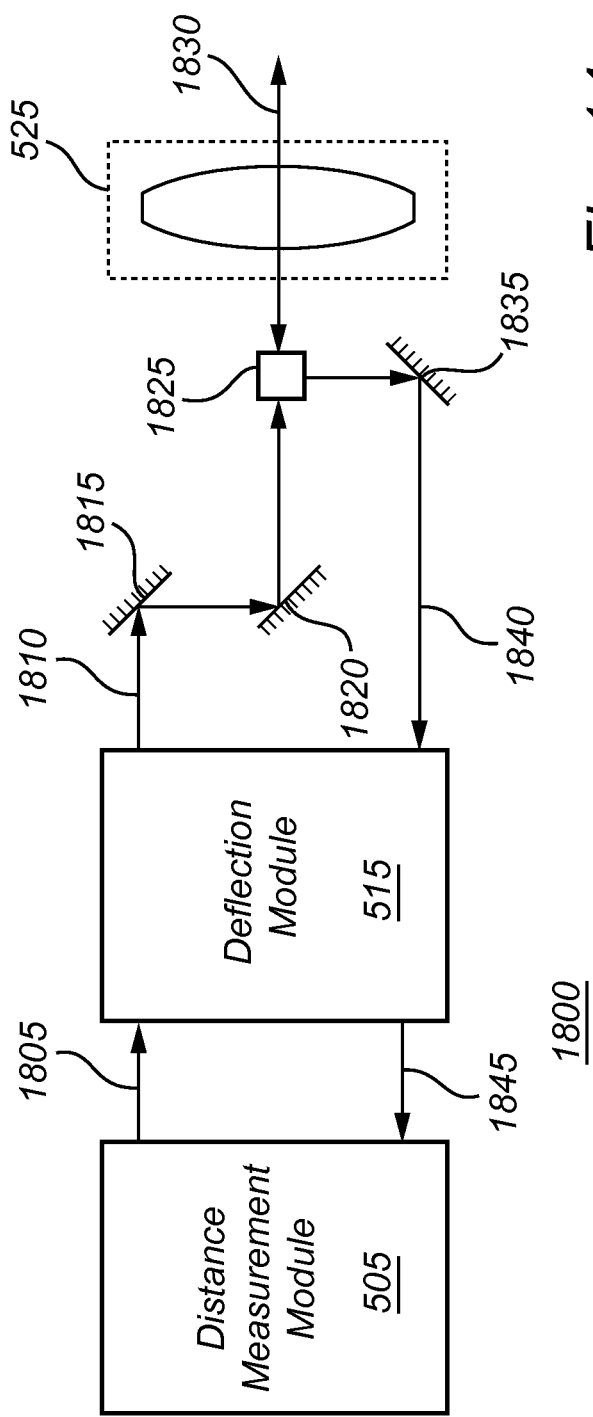
Figure 15:
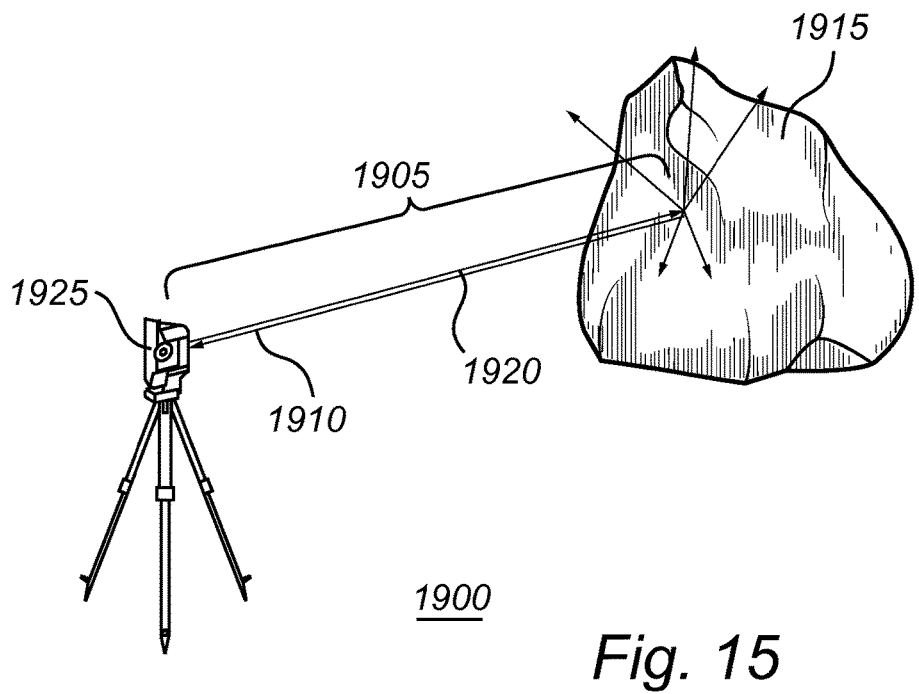
Figure 16:
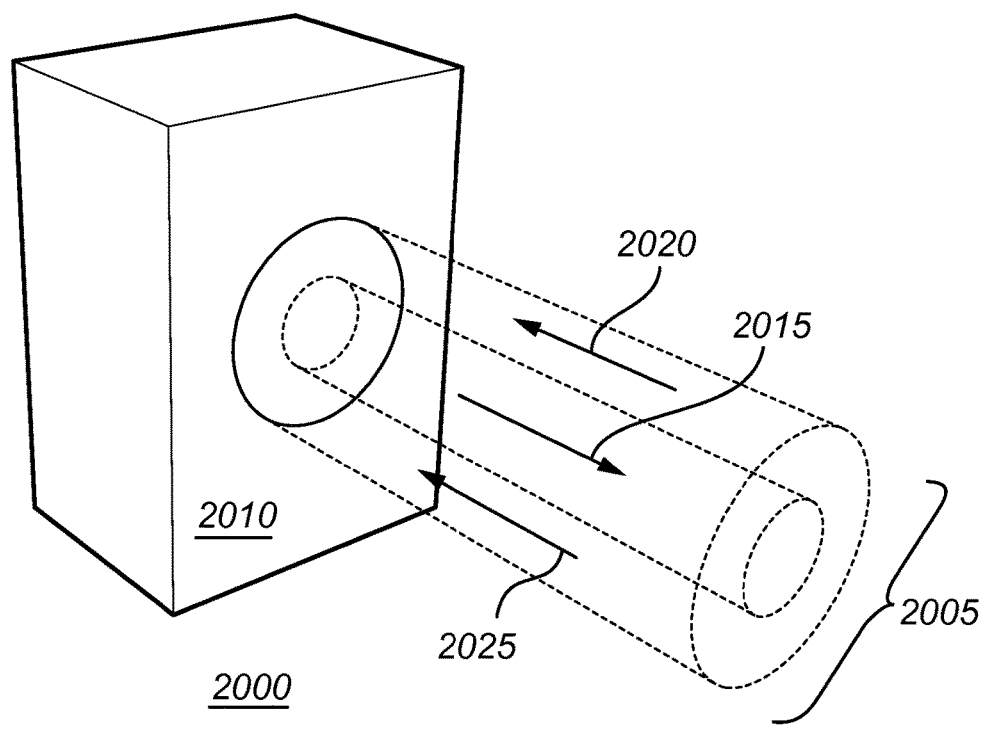
Figure 17:
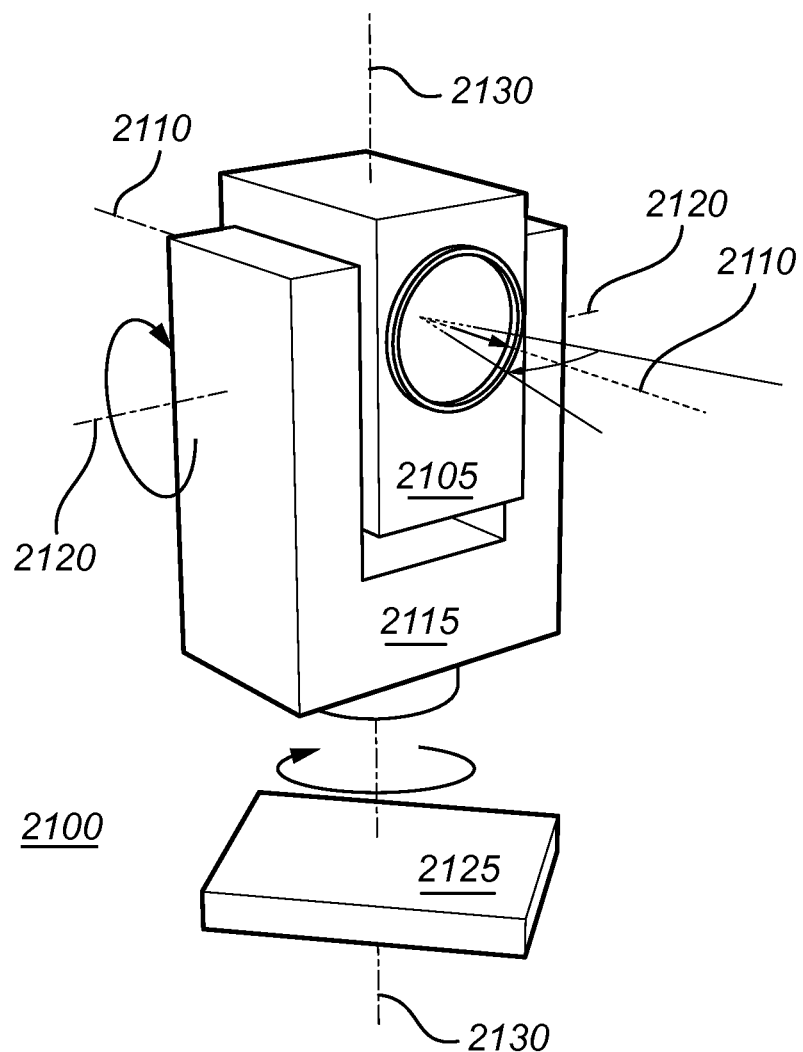
Figure 19:
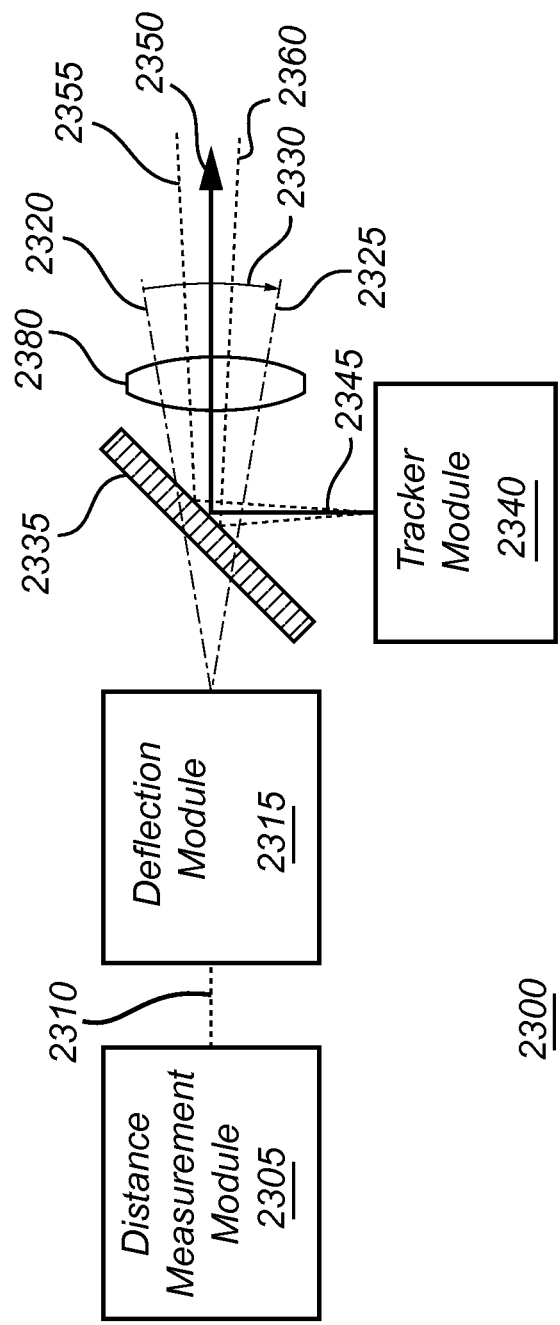
Figure 20:
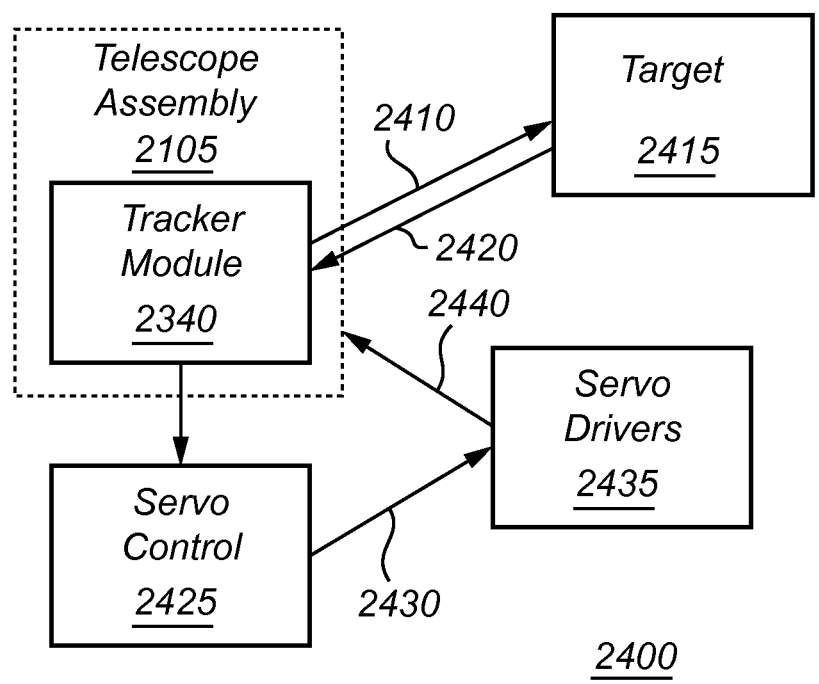
Figure 21:
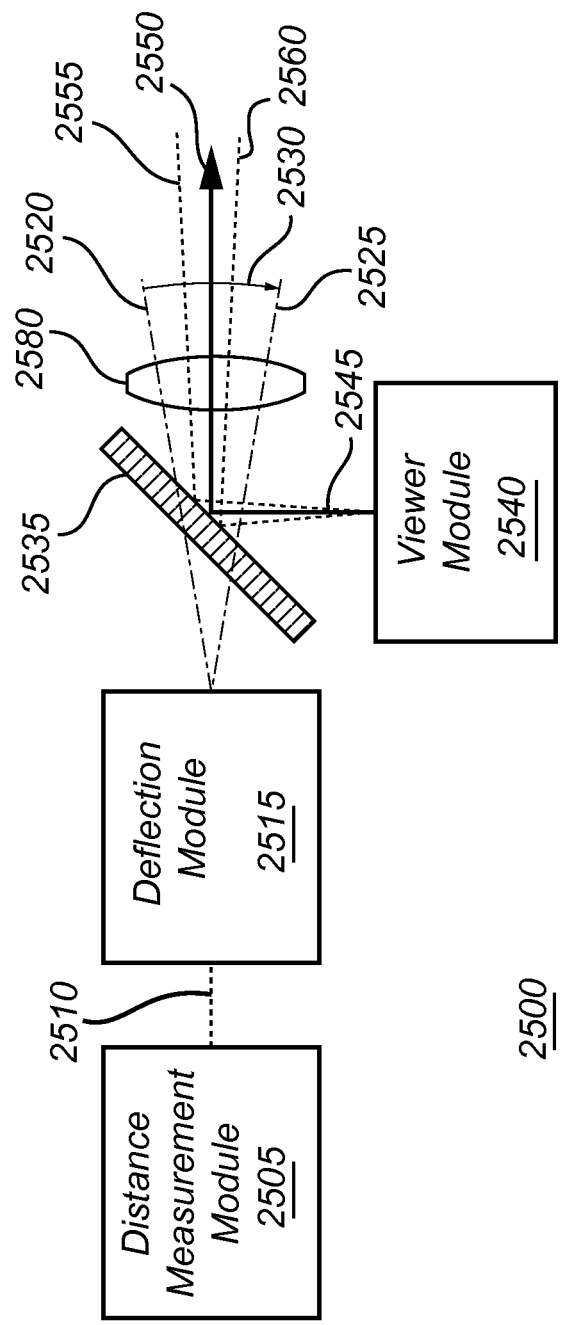
Figure 22:
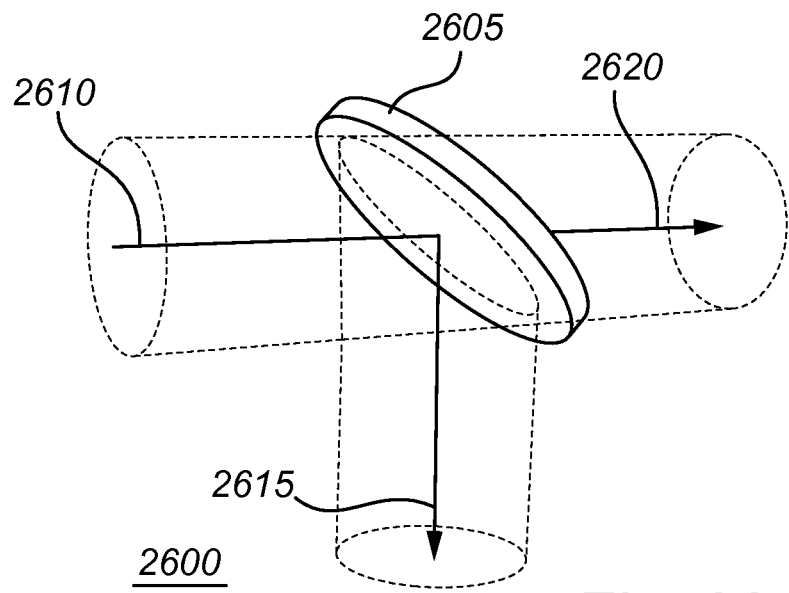
Figure 23:
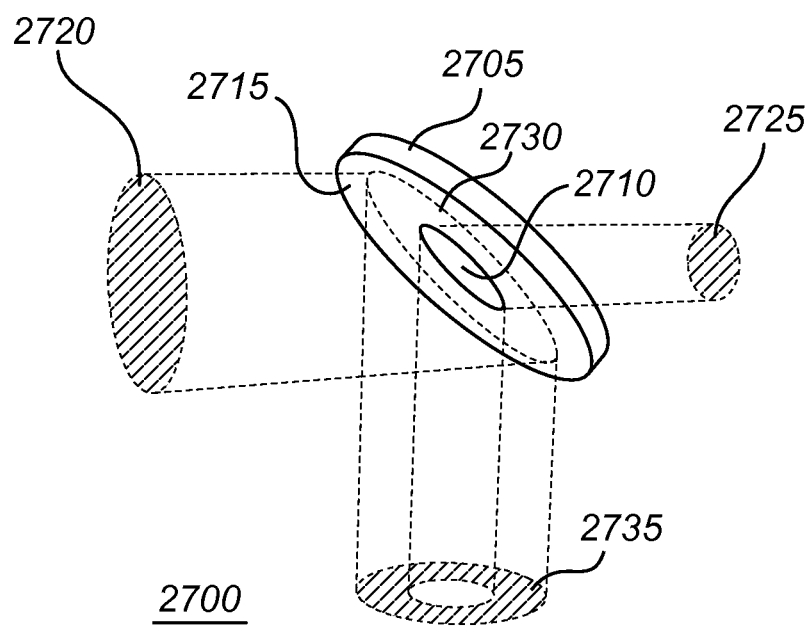
Figure 24:
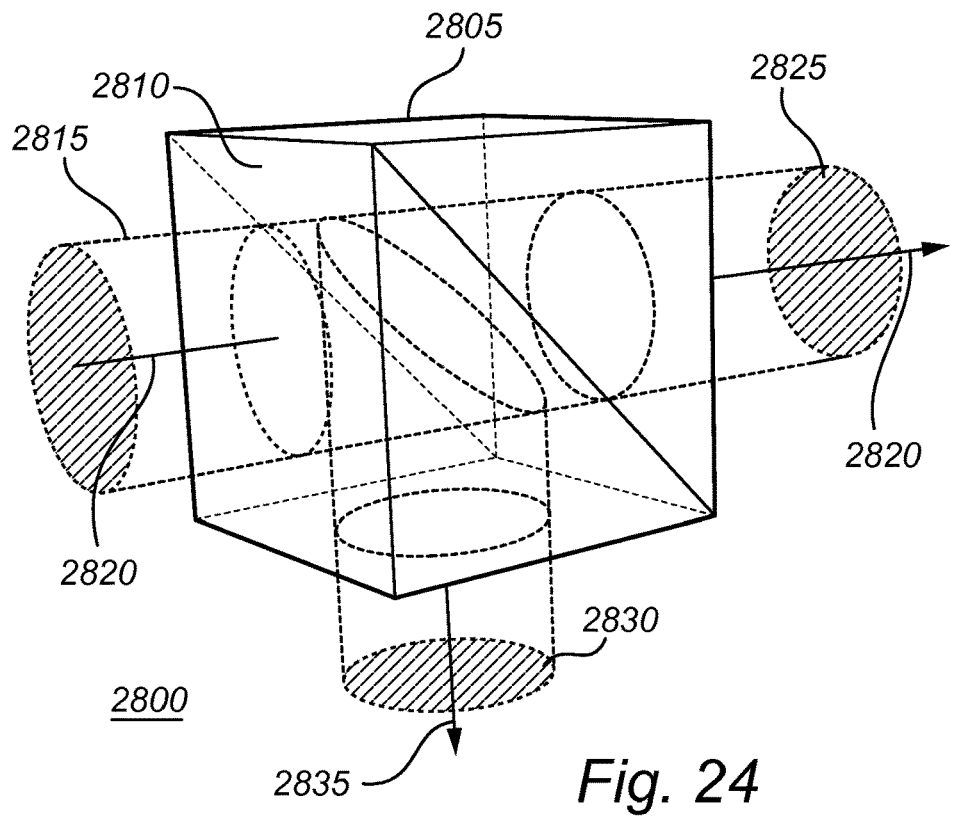
Figure 25:
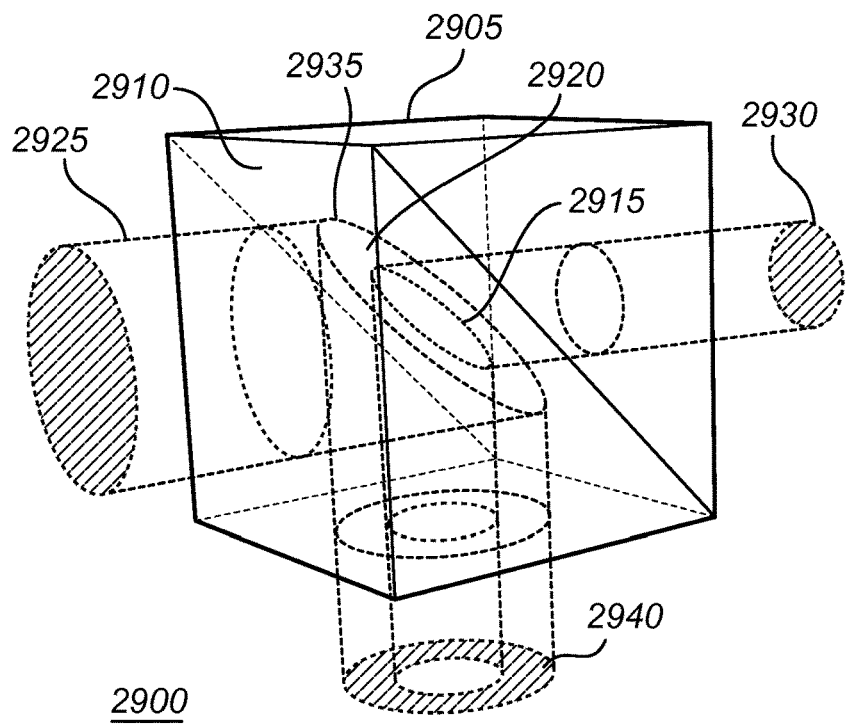
Figures 26A, 26B, 26C:
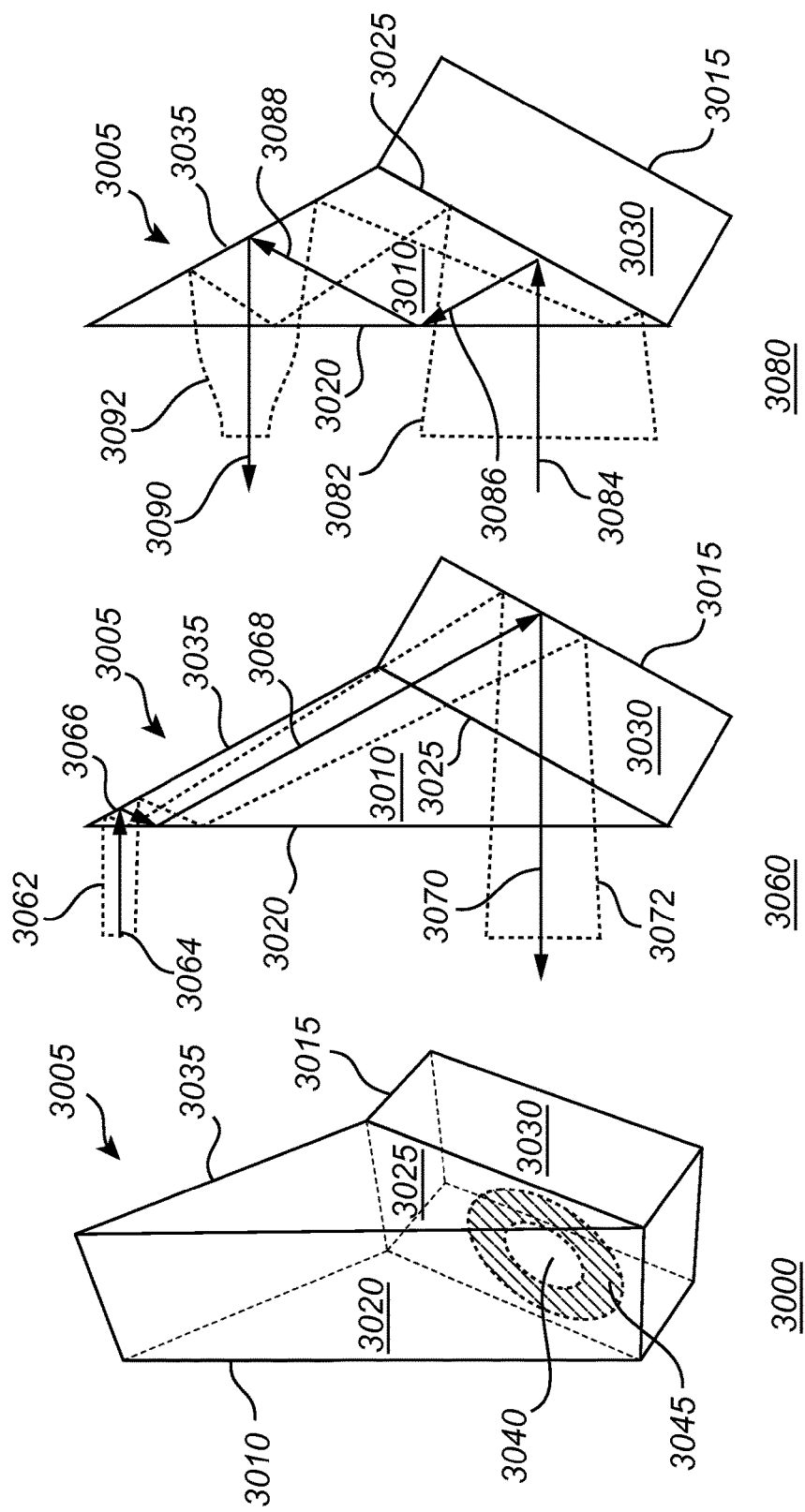

FIGS. 7A-E show the beam path with the deflection element of FIG. 6 at a zero-degree rotation angle, a ten-degree rotation angle, a twenty-degree rotation angle, a twenty-five-degree rotation angle and a thirty-five-degree rotation angle, respectively;

FIGS. 8A-C show the beam path with the deflection element of FIG. 6 at a zero-degree rotation angle, a ten-degree rotation angle and a twenty-degree rotation angle, respectively, in relation to a front lens assembly;

FIG. 9 shows a further example of a deflection element in accordance with some embodiments;

FIG. 10 shows a further example of a deflection element in accordance with some embodiments;

FIG. 11A shows a deflection element rotating about an axis in accordance with some embodiments;

FIG. 11B shows a deflection element oscillating about an axis in accordance with some embodiments;

FIG. 12A, FIG. 12B and FIG. 12C show deflection of a beam path with linear motion of a deflection element in accordance with some embodiments;

FIG. 13A, FIG. 13B and FIG. 13C show the effect of a final lens assembly on a beam path that is deflected by an optical wedge in accordance with some embodiments;

FIG. 14 schematically illustrates an embodiment having separate transmit path and receive path, and a splitter in accordance with some embodiments;

FIG. 15 illustrates the concept of a measurement beam in accordance with some embodiments;

FIG. 16 further illustrates a measurement beam in accordance with some embodiments;

FIG. 17 schematically illustrates axes of a measurement instrument in accordance with some embodiments;

FIG. 18A illustrates a measurement apparatus with transmit path and receive path deflected in a first direction about a deflection point in accordance with some embodiments;

FIG. 18B illustrates a measurement apparatus with transmit path and receive path deflected in a second direction about a deflection point in accordance with some embodiments;

FIG. 19 show a measurement system having an integrated tracking module in accordance with some embodiments;

FIG. 20 shows a block diagram of a tracking system in accordance with some embodiments;

FIG. 21 shows a measurement system having an integrated viewer module in accordance with some embodiments;

FIG. 22 schematically illustrates the operation of a first type of beam splitter;

FIG. 23 schematically illustrates the operation of a second type of beam splitter;

FIG. 24 schematically illustrates the operation of a third type of beam splitter;

FIG. 25 schematically illustrates the operation of a fourth type of beam splitter;

FIG. 26A shows a beam splitter for use as a mixing point (or splitting point) in accordance with some embodiments;

FIG. 26B schematically illustrates the path of a transmitted light beam through the beam splitter of FIG. 26A.

FIG. 26C schematically illustrates the path of a received light beam through the beam splitter of FIG. 26A.

Figure 29B:
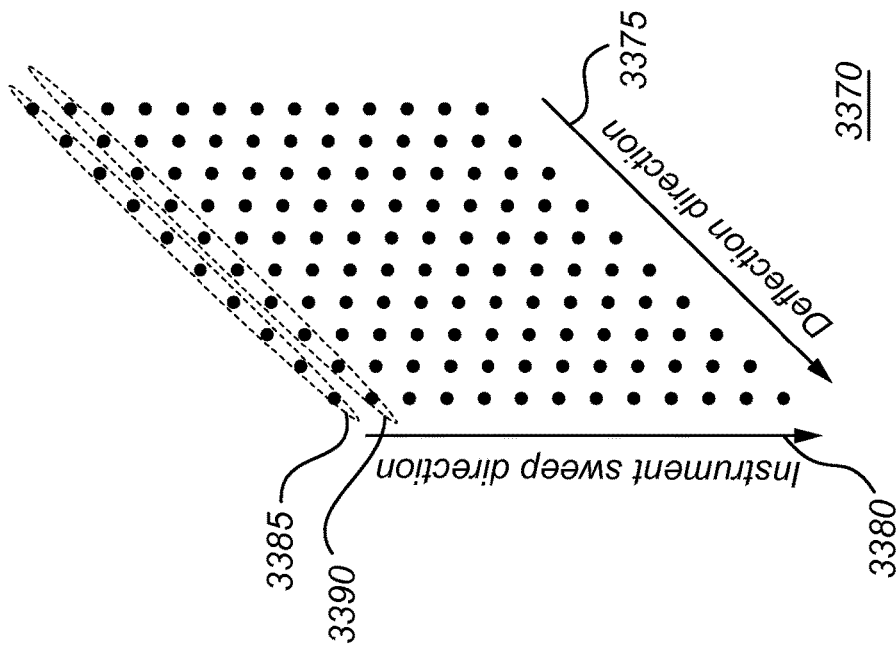
Figure 29A:
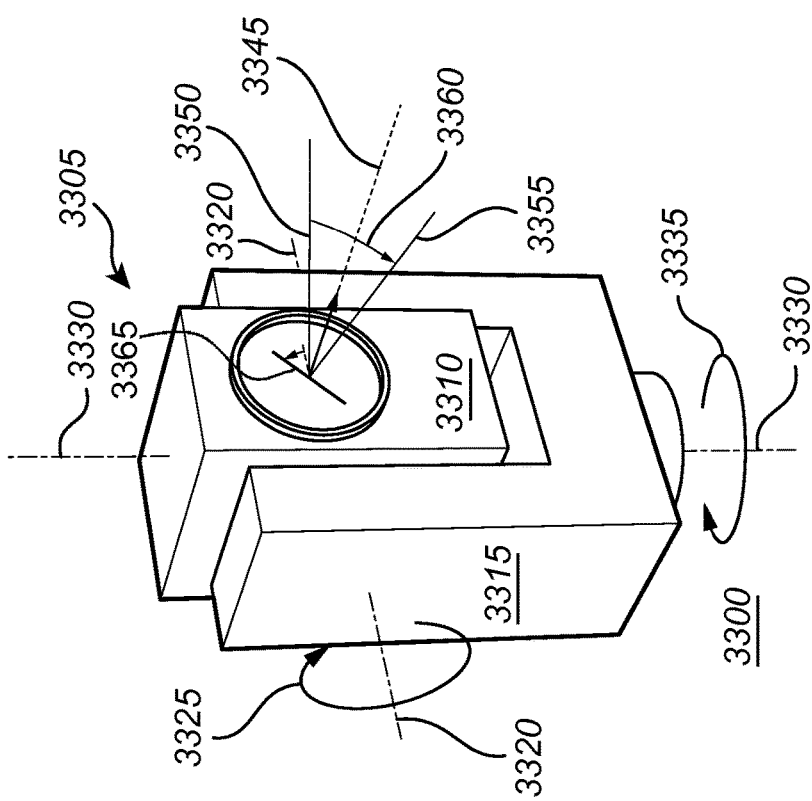

FIG. 27A shows a measurement instrument configured for vertical beam deflection and azimuthal sweep of the center unit in accordance with some embodiments;

FIG. 27B shows a pattern of measurements acquired with the instrument configuration of FIG. 27A;

FIG. 28A shows a measurement instrument configured for vertical sweep of the center unit and beam deflection in a plane orthogonal to that of FIG. 27A, in accordance with some embodiments;

FIG. 28B shows a pattern of measurements acquired with the configuration of FIG. 28A;

FIG. 29A shows a measurement instrument configured for beam deflection in a tilted plane with azimuthal and/or vertical sweep of the center unit in accordance with some embodiments; and FIG. 29B shows a pattern of measurements acquired with the instrument configuration of FIG. 29A.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

The present invention will now be described more fully hereinafter with reference to the accompanying drawings, in which exemplifying embodiments are shown. The invention may however be embodied in many different forms and should not be construed as limited to the embodiments set forth herein, these embodiments are rather provided by way of examples.

Figure 1:
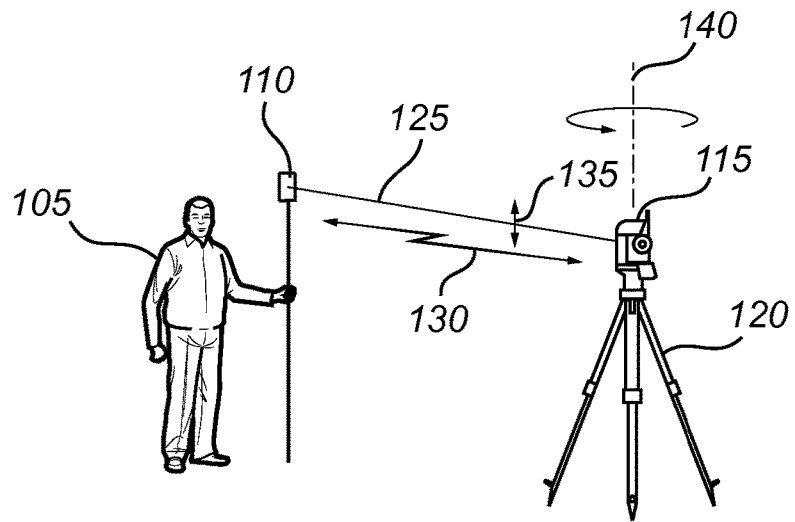
Figure 2:
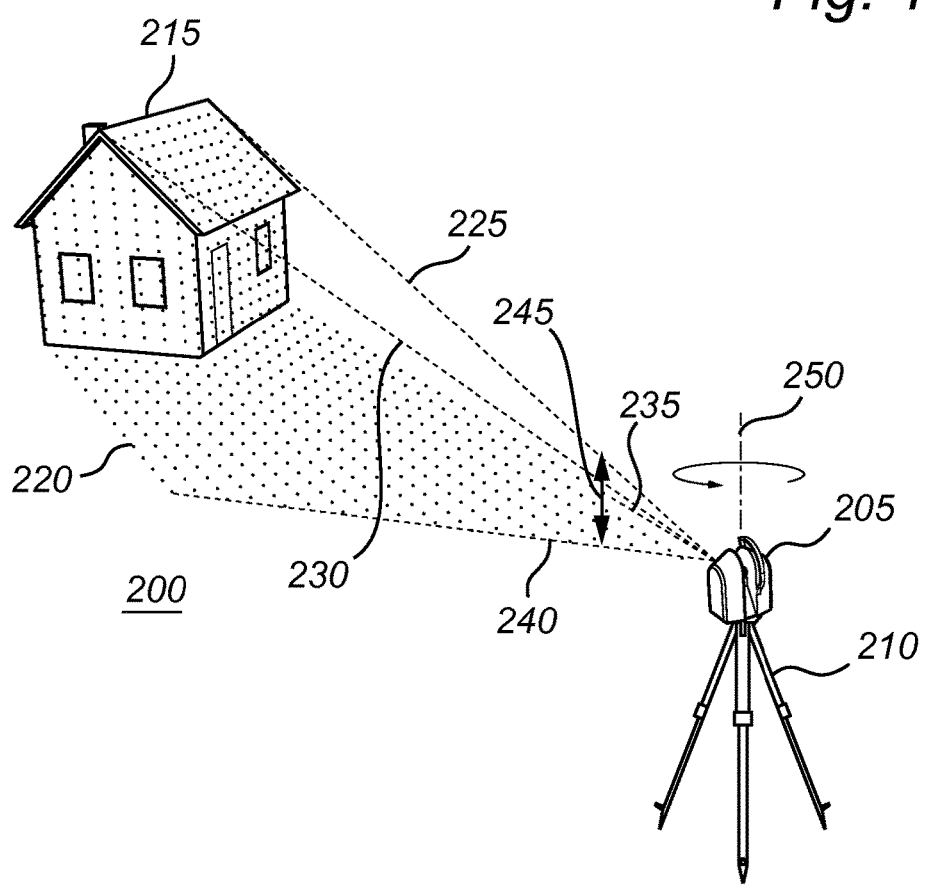
Figure 3:
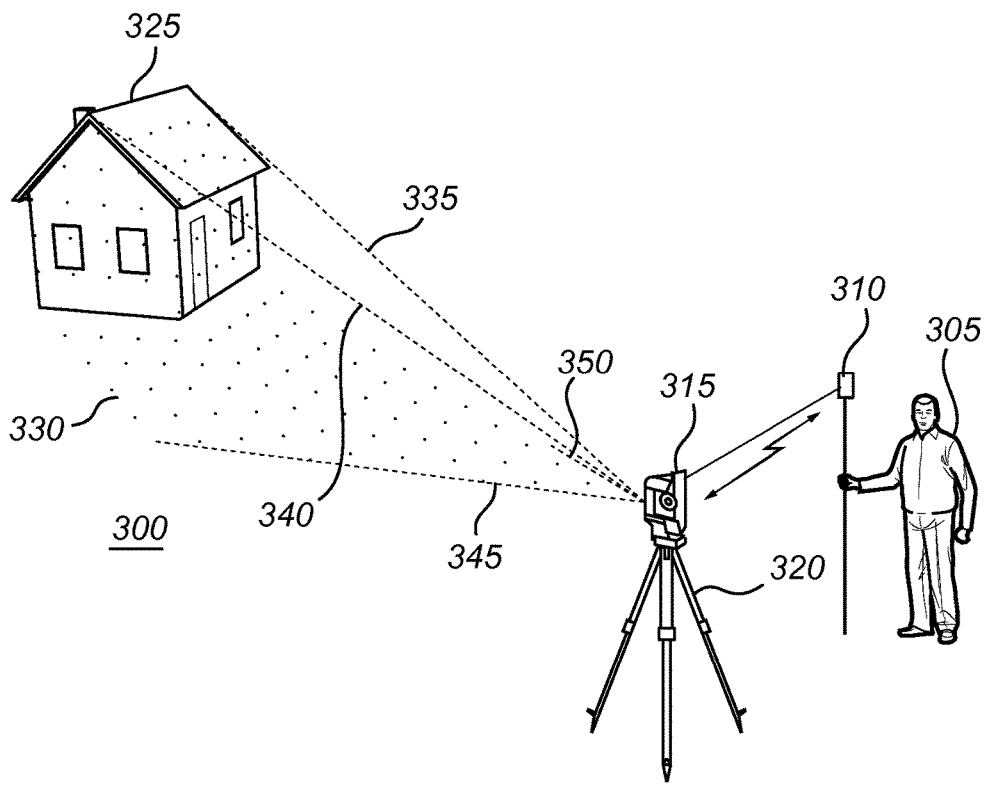
Figure 4A:
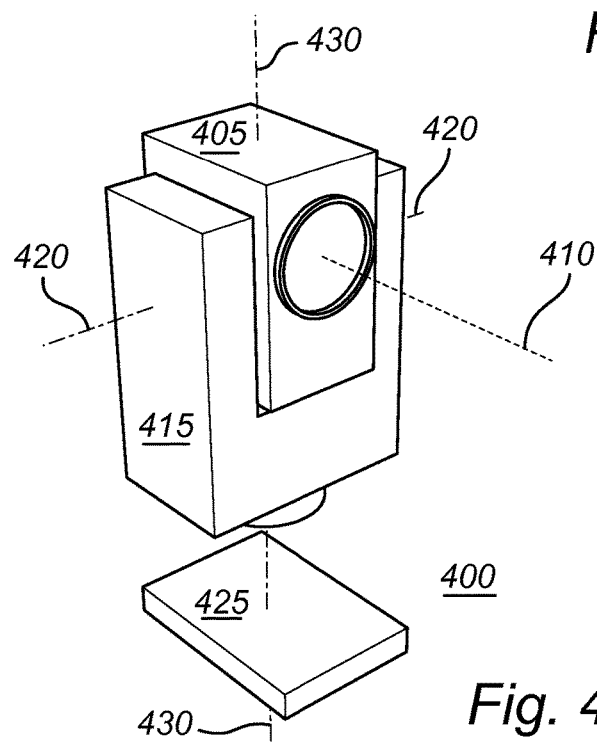

FIG. 4A schematically illustrates a measurement instrument 400 in accordance with some embodiments. The instrument 400 includes a center unit 405, such as a telescope assembly, having an instrument optical axis 410. The telescope assembly 405 is mounted for rotation about two axes: on a trunnion of an alidade 415 for rotation about a first (trunnion) axis 420, and on a base 425 for rotation about a second (azimuthal) axis 430.

Figure 4B:
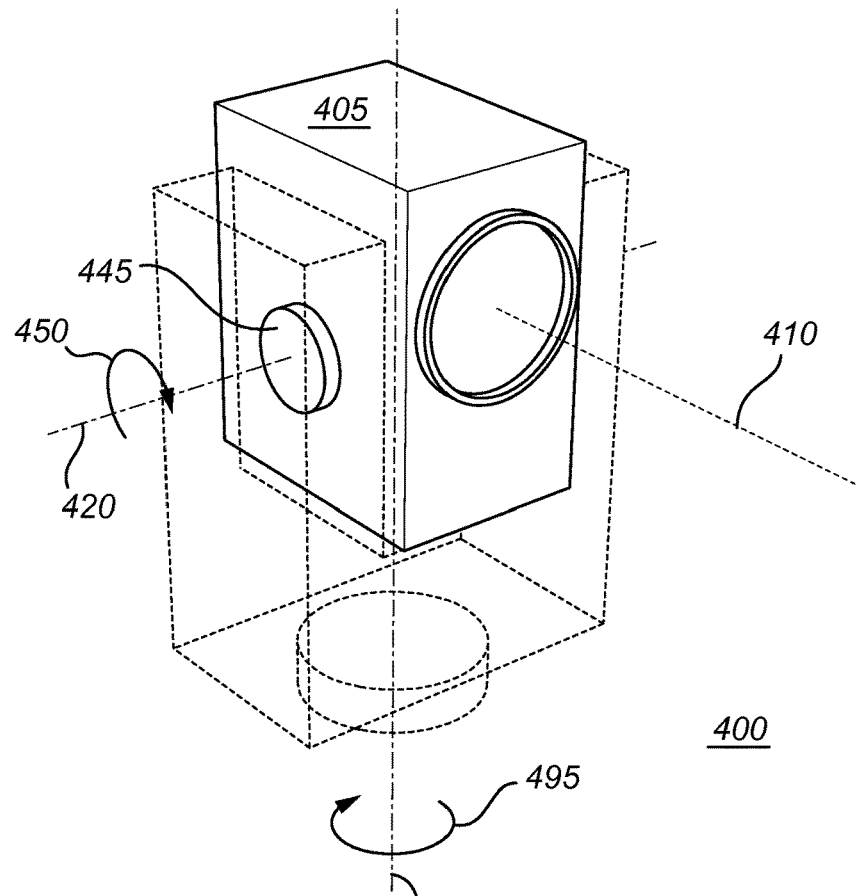

FIG. 4B shows the instrument of FIG. 4A with the alidade 415 in phantom lines to reveal the trunnion 445 defining the trunnion axis 420. Rotation of the telescope assembly 405 about the trunnion axis is indicated by arrow 450. Rotation of the alidade 415 about the azimuthal axis 430 is indicated by arrow 495.

Figure 4C:
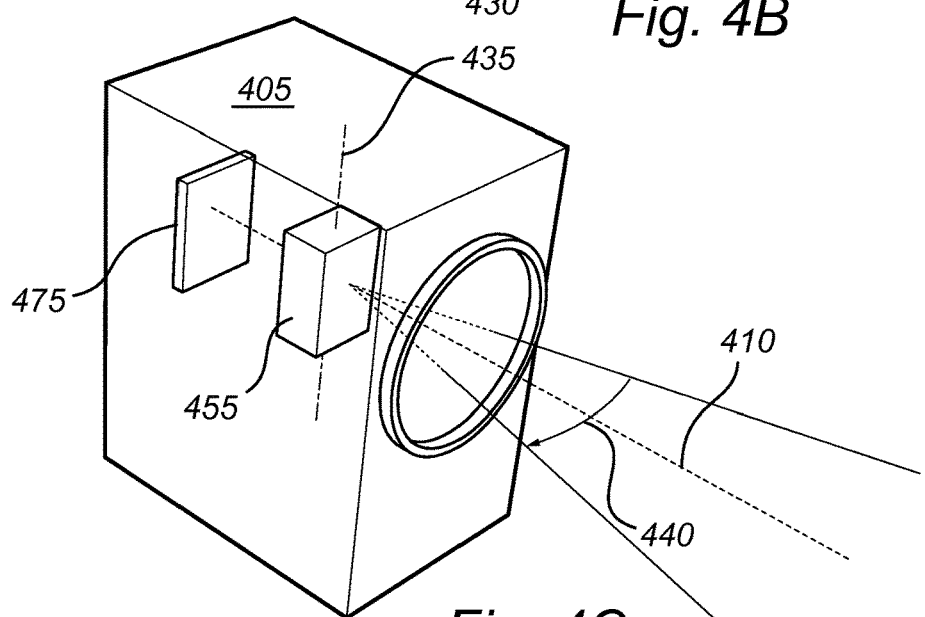

As illustrated in FIG. 4C, the instrument may further include a deflection module 455 such that a measurement beam of an electronic distance measurement (EDM) module 475, nominally aligned with the optical axis 410, is deflectable about a third axis of rotation 435 as indicated by arrow 440. FIG. 4C shows an optical path extending from the EDM 475 to the deflection module 455 at which it is deflected. The EDM 475 and the deflection module 455 are arranged within the center unit 405 of the measurement instrument 400.

Figure 5:
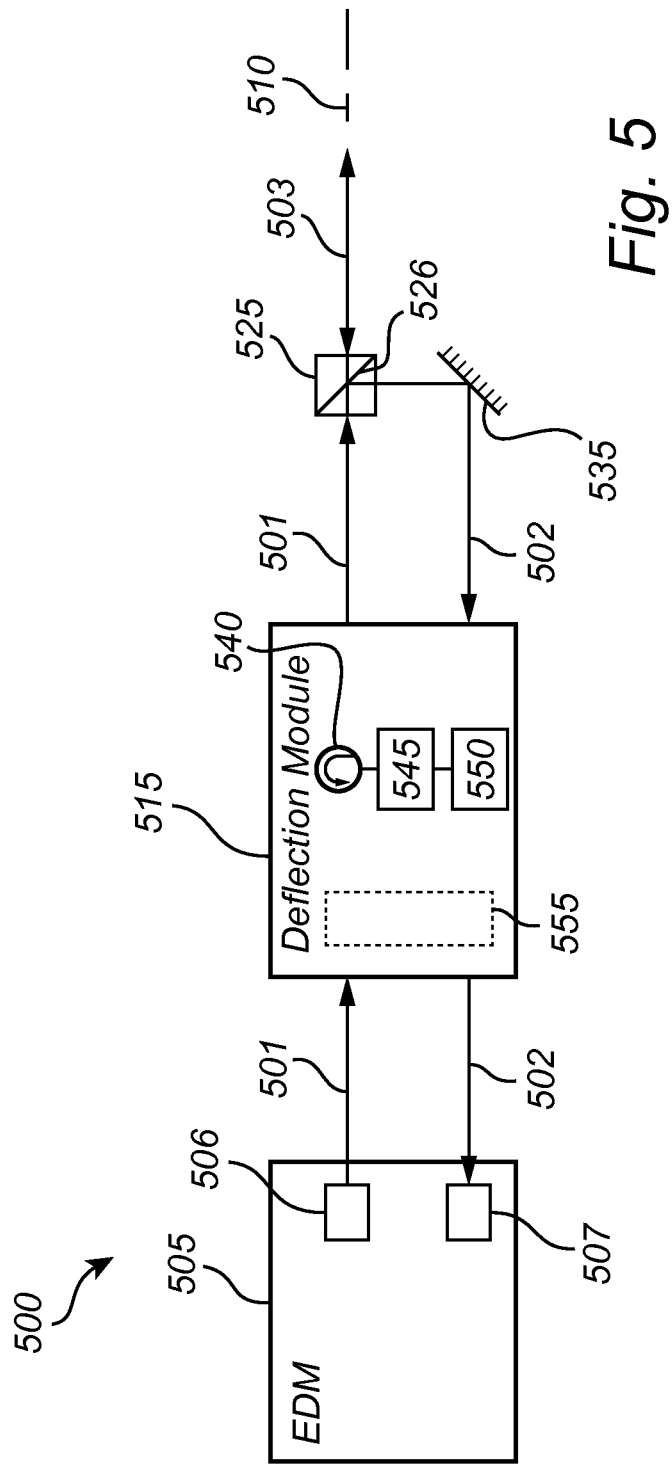
FIG. 5 is a schematic diagram of an EDM subsystem in accordance with some embodiments.

FIG. 5 is a schematic diagram of an electronic distance measurement subsystem 500 in accordance with some embodiments. A distance measurement module (EDM) 505 transmits optical radiation along a transmit path 501 and receives optical radiation along a receive path 502. A deflection module 515 may deflect at least one of the transmit path 501 and the receive path 502 across an instrument optical axis 510. In FIG. 5, no specific deflection is illustrated. This aspect will however be described in more detail with reference to FIG. 18.

The transmit path 501 and the receive path 502 merge at a splitting point or mixing point 526 of the splitter/mixer 525 into a measurement beam 503. As will be further explained with reference to e.g. FIGS. 22-26, in some embodiments, a beam splitter may have a surface (or surfaces) with regions differing by their reflectivity (e.g. depending on radius). In these embodiments, the splitting point is stationary on the beam splitter surface and the optical system is designed to both deflect the beam and to aim it towards the splitting point. However, in some other embodiments, it may be envisaged that the splitting point moves over the beam splitter surface.

The deflection module 515 is optically located between the EDM 505 and the splitter 525. As illustrated in FIG. 5, the subsystem 500 may include at least one mirror for redirecting the receive path 502 in the same general direction as the transmit path 501, in the present example in the direction of the EDM 505, after separation at the splitting point 526. In FIG. 5, the transmit path 501 and the receive path 502 are parallel (yet separated and distinct) between the splitter 525 (or splitting point 526) and the EDM 505. It will be appreciated that the transmit path 501 and the receive path 502 may not necessarily be parallel between the splitting point 526 and the EDM 505 and may follow different directions.

The EDM 505 may comprise a transmitter or laser source 506 for transmission of an optical radiation along the transmit path 501 and a detector 507 (or receiver) for detecting optical radiation reflected at a target or any object (or surroundings) towards which the optical radiation has been transmitted from the laser source (via the deflection module 515 and the splitter 525). The laser source and the detector may be two separate entities arranged at two different locations in the EDM 505.

The splitter 525 separates within the subsystem 500 of the instrument, the transmit path 501 and the receive path 502 in two distinct paths. The deflection module 515 is configured to make the transmit path 501 and the receive path 502 meet at the splitting point 526 of the splitter 525 such that, between the splitting point 526 (or splitter 525) and the deflection module 515, the transmit path 501 and the receive path 502 are separated and distinct while, from the splitting point (or splitter) and out of the subsystem 500, the transmit path and the receive path are merged within a measurement beam (i.e. the transmit and receive paths overlap).

Without loss of generality and for illustration purposes, FIG. 5 shows also that the deflection module may include at least one deflection element 540 to deflect at least one of the transmit path 501 and the receive path 502 as it rotates or moves. Further, FIG. 5 illustrates that the deflection element may be rotated or displaced by a drive element 545. The drive element 545 may produce oscillating rotational motion of the deflection element 540. In some embodiments, the drive element 545 may produce continuous rotational motion of the deflection element 540. In some embodiments, the drive element 545 may produce directed rotational motion of the deflection element 540 to a selected orientation.

In some embodiments, the drive element 545 may be a motor having substantially constant rotational speed. In some embodiments, the drive element 545 may be one of a three-phase motor and a direct-current motor. In some embodiments, the drive element 545 may include a piezo-electric element.

FIG. 5 illustrates also that the instrument may be equipped with an angle sensor 550 for measuring a rotation angle or another kind of sensor for measuring a translational displacement of the deflection element 540. In some embodiments, the angle sensor 550 may be operative to detect an angle of rotation of the deflection element 540 relative to the optical axis 510 (or a translational displacement of the deflection element 540 relative to the optical axis 510). In some embodiments, the angle sensor 550 may be an angle encoder. The instrument 500 may also be equipped with a drive controller 555 in communication with the drive element 545 and the angle sensor 550 for controlling rotational motion (and/or a translational displacement) of the deflection element 540 by the drive element 545.

In some embodiments, the drive controller 555 may be responsive to the angle sensor (or a displacement sensor) 550 to control the drive element 545 in dependence upon a rotation angle of the deflection element 540 (or a translational displacement of the deflection element 540).

Although FIG. 5 illustrates some details of elements forming an exemplifying deflection module according to an embodiment, the deflection module 515 of the subsystem 500 shown in FIG. 5 may be any deflection module providing the function of deflecting at least one of the transmit path and the receive path across the optical axis of the instrument.

Referring to FIGS. 4A-C and 5, the subsystem 500 described with reference to FIG. 5 may be mounted within the center unit 405 of a total station 400 as described with reference to FIGS. 4A-C with the optical axis of the instrument 410 aligned with the optical axis 510 of the subsystem 500. Accordingly, a total station with a deflection module 515 arranged within its center unit is provided.

Such a measurement instrument or total station provides both for measurements to a specific target according to a first mode with the precision of a total station and for scanning of a scene according to a second mode with the speed of a geodetic scanner.

FIG. 6 illustrates at 1000 a first embodiment of a deflection element which may be used as the deflection element denoted 540 in the subsystem 500 described with reference to FIG. 5. The deflection element may be a prism 1005 which rotates as shown by arrow 1010 about a rotation axis 1015. A beam 1020 traverses the prism 1005 and exits as beam 1025. The prism 1005 is shown as having eight faces distributed about the rotation axis 1015. In some embodiments, the prism 1005 may have six to ten faces distributed about the rotation axis 1015.

The prism 1005 may be operative to displace the transmit path and/or the receive path as it rotates. FIG. 7A-FIG. 7E illustrate the deflection of a beam path with rotation of the prism 1005.

Figure 7A:
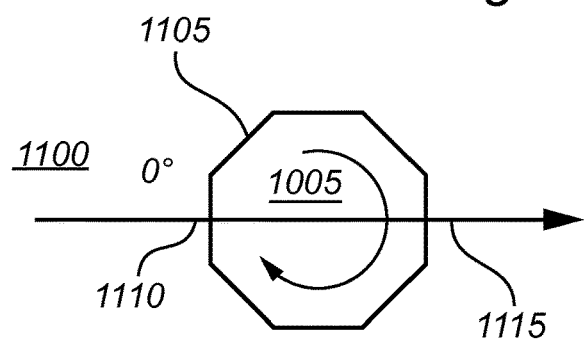

FIG. 7A at 1100 shows the prism 1005 at a zero-degree rotation angle as indicated at 1105. An entry beam path 1110 and an exit beam path 1115 are aligned.

Figure 7B:
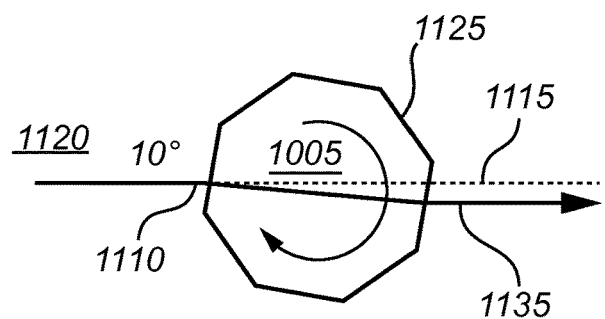

FIG. 7B at 1120 shows the prism 1005 at a ten-degree rotation angle in the clockwise direction relative to FIG. 7A as indicated at 1115. The exit beam path 1135 is displaced downwardly relative to the entry beam path 1110 and is parallel to the extension of the entry beam path 1110. Reference number 1115 shows the extension of the incoming beam 1110 in the prism 1005. Although not necessary, it will be appreciated that in some embodiments the nominal optical path of the outgoing beam, as denoted by 1115, i.e. the beam path in a configuration with a zero-degree rotation angle as in FIG. 7A, may be aligned with the normal optical axis of the subsystem in which the deflection element 1005 is arranged.

Figure 7C:
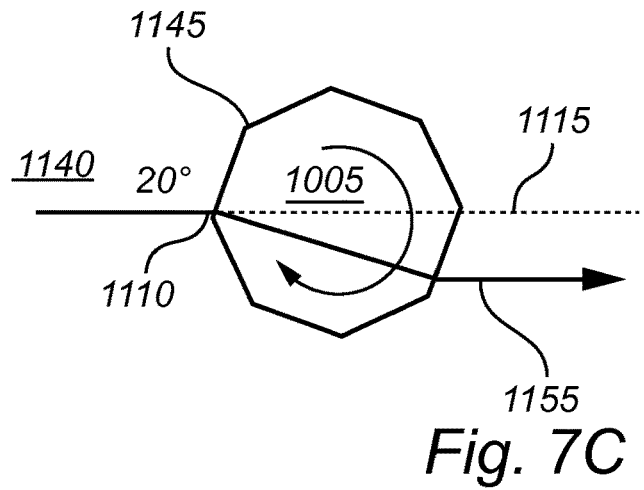

FIG. 7C at 1140 shows the prism 1005 at a twenty-degree rotation angle in the clockwise direction relative to FIG. 7A as indicated at 1145. The exit beam path 1155 is displaced still further downward relative to the entry beam path 1110 than in FIG. 7B and is parallel to the extension of the entry beam path 1110.

Figure 7D:
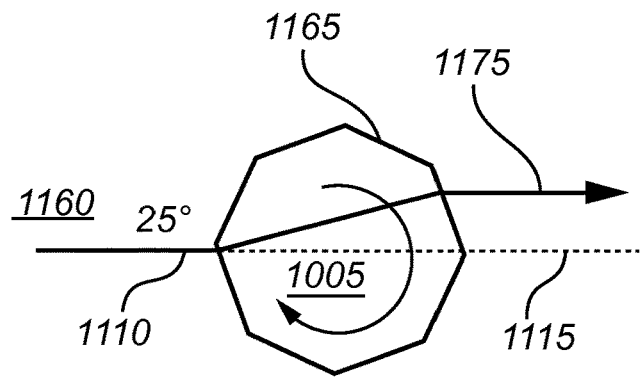

FIG. 7D shows at 1160 the prism 1005 at a twenty-five-degree rotation angle in the clockwise direction relative to FIG. 7A as indicated at 1165. The exit beam path 1175 is displaced upward relative to the entry beam path 1110 and is parallel to the entry beam path 1110.

Figure 7E:
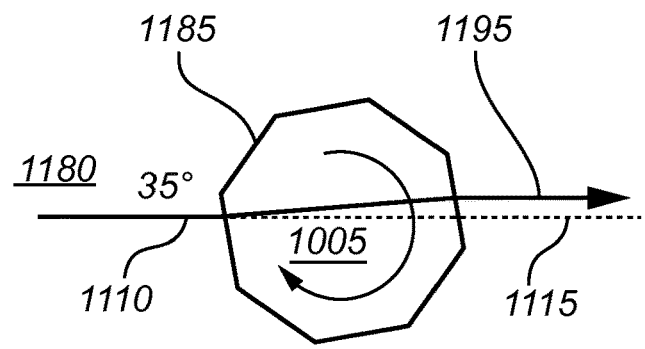

FIG. 7E shows at 1180 the prism 1005 at a thirty-five-degree rotation angle in the clockwise direction relative to FIG. 7A as indicated at 1185. The exit beam path 1195 is displaced somewhat less upward relative to the entry beam path 1110, than in FIG. 7D and is parallel to the entry beam path 1110.

The series of images in FIG. 7A-FIG. 7E show that the beam path is displaced in one direction as the prism 1005 is rotated and jumps back momentarily when the entering beam switches from one facet to the next. This has the advantage of converting a continuous rotation into a repetitive and linear displacement of the beam. Continuous rotation requires very little energy to sustain and causes very little vibration, as compared for example with an oscillating movement of a mechanical element.

In some embodiments, the deflection element may further include a deflection lens assembly in the transmit path and/or receive path, such that displacement of the transmit path and/or receive path is converted to an angular deflection across the optical axis of the instrument. FIG. 8A-FIG. 8C illustrate the deflection of a beam path with rotation of the prism 1005 and the effect of introducing a deflection lens assembly 1202.

FIG. 8A at 1200 shows the prism 1005 at a zero-degree rotation angle as in FIG. 7A, as indicated at 1205. The entry beam path 1110 and the exit beam path 1115 are aligned. The deflection lens assembly 1202 has a focal distance f shown at 1215. The exit beam path passes through the deflection lens assembly 1202 to a focal point 1210 without deflection.

FIG. 8B at 1220 shows the prism 1005 at a ten-degree rotation angle as compared to the configuration shown in FIG. 8A (i.e. as in FIG. 7B) as indicated at 1225. The exit beam path 1135 is displaced relative to the entry beam path 1110. The exit beam path 1135 then passes through the deflection lens assembly 1202 and is deflected toward the focal point 1210 at a deflection angle 1230.

FIG. 8C at 1240 shows the prism 1005 at a twenty-degree rotation angle as in FIG. 7C as indicated at 1245. The exit beam path 1155 is displaced still further relative to the entry beam path 1110. The exit beam path 1155 then passes through the deflection lens assembly 1202 and is deflected toward the focal point 1210 at a deflection angle 1250.

The series of images in FIG. 8A-FIG. 8C show that the exit beam path is directed toward the focal point 1210 at each deflection increment as the prism 1005 is rotated. The focal point 1210 is the rotation point of the deflected beam.

In some embodiments, the prism 1005 may be operative to displace the receive path as it rotates, such as by having the receive path spaced apart from the transmit path along the rotation axis 1015 of the prism 1005 and parallel to the transmit path. In some embodiments, the deflection lens assembly may also lie in the receive path, such that displacement of the receive path with rotation of the prism 1005 is converted to an angular deflection across the optical axis of the instrument. In some other embodiments, two completely separate deflection elements may be used for the transmit path and the receive path.

FIG. 9 at 1300 shows a further example of a deflection element which may be used as the deflection element 540 in the subsystem 500 described with reference to FIG. 5. In this example, the deflection element may be a multi-faceted mirror 1305 rotating as indicated at 1310 about a rotation axis 1315. The multi-faceted mirror 1305 is shown as having eight facets distributed about the rotation axis 13515. In some embodiments, the multi-faceted mirror 1305 may have twenty to forty such facets. A beam arriving along a path 1320 may be reflected from a facet of the mirror 1305 to depart along another path 1325. This other path 1325 may be deflected with rotation of the mirror 1305 so that the departing beam path (i.e. a pointing direction of the departing beam) may be swept around the rotation axis 1315. In other words, the departing beam path 1325 rotates around the rotation axis, as indicated at 1330, while it remains orthogonal to the rotation axis 1315.

FIG. 10 at 1400 shows a further example of a deflection element which may be used as the deflection element 540 in the subsystem 500 described with reference to FIG. 5. In this example, the deflection element may be a mirror disk 1405 with a scalloped, curving mirrored surface 1410. The mirror disk 1405 may rotate as indicated by arrow 1415 about a rotation axis 1420. A beam entering along an entry beam path 1425 may be deflected along an exit beam path 1430. The exit beam path 1430 may be deflected back and forth with rotation of the mirror disk 1405 about the rotation axis 1420.

In some embodiments, the scalloped, curving mirrored surface 1410 may be shaped to provide linear deflection of at least one of the transmit path and the receive path when rotated about the rotation axis 1420 at a constant rotational velocity. In some other embodiments, the scalloped, curving mirrored surface 1410 may be shaped to provide non-linear deflection of at least one of the transmit path and the receive path when rotated about the rotation axis 1420 at a constant rotational velocity.

The examples of FIG. 7A-FIG. 7E, FIG. 8A-8C, FIG. 9 and FIG. 10 show the deflection element rotating in the clockwise direction. In some embodiments the deflection element may rotate in the opposite (counter-clockwise) direction. In some embodiments, the deflection element may rotate alternately in the clockwise and counter-clockwise directions (i.e., oscillates).

It will be appreciated that in the examples shown in FIGS. 7-10, in case the deflection element, such as a prism, a multi-faceted mirror or a disk having a scalloped curving mirrored surface, is rotated such that the incoming beam hits the deflection element at an edge between two facets, the beam may be split in two and the deflection may then become ambiguous. For this purpose, the rotation of the deflection element may be adjusted to avoid that the beam hits an edge between two facets. Alternatively, the instrument may be configured such that no measurement is captured (by controlling the operation of the distance measurement module for instance) while an edge is located in the optical path of the beam or such that any measurement captured under such conditions is not recorded or taken into account. While a larger number of facets would require a lower rotation speed to achieve a certain number of deflection sweeps, this would on the other hand result in more edges obstructing the measurements, which would then have to be disregarded because of ambiguity.

FIG. 11A at 1500 shows an example of a deflection element, shown generically at 1510, which may be used as the deflection element 540 in the subsystem 500 described with reference to FIG. 5. The deflection element 1510 may rotate about an optical axis 1520 in one direction (e.g., counter-clockwise) as indicated by arrow 1530.

FIG. 11B at 1550 shows an example of a deflection element, shown generically at 1560, which may be used as the deflection element 540 in the subsystem 500 described with reference to FIG. 5. The deflection element 1560 may rotate about an optical axis 1520 alternately in the clockwise direction and in the counter-clockwise direction (i.e., oscillating) as indicated by arrow 1570.

FIG. 12A, FIG. 12B and FIG. 12C show deflection of a beam path with linear motion of a deflection element in accordance with some embodiments.

FIG. 12A at 1600 shows an entry beam path 1610 along the optical axis 1605 of the deflection element 1625, which in the present example is a lens (or lens assembly). The lens is mounted for linear motion across the optical axis 1605. In the specific examples shown in FIGS. 12A-12C, the lens 1625 moves orthogonally to the optical axis 1605. In FIG. 12A, an exit beam path 1615 also lies on the optical axis 1605 of the lens 1625 and is aligned with the entry beam path 1610.

FIG. 12B at 1620 shows the lens 1625 displaced downwardly relative to the entry beam path 1630. As a result, the exit beam path 1635 is deflected downwardly at an angle relative to the extension of the entry beam path 1630.

FIG. 12C at 1640 shows a lens 1625 displaced upwardly relative to the entry beam path 1650. The exit beam path 1655 is deflected upwardly at an angle relative to the extension of the entry beam path 1650.

In some embodiments, the beam may be deflected by linear displacement of a deflection element.

FIG. 13A-FIG. 13C show an example in which the deflection element is an optical wedge 1705 displaced by a linear drive element generally transversely to an optical axis 1710 of a deflection lens assembly 1712.

In FIG. 13A at 1700, the entry beam path 1715 is deflected by a wedge 1705 toward the optical axis 1710. The exit beam path 1720 passes along the optical axis 1710.

In FIG. 13B at 1730, the wedge 1705 is moved upward as indicated by arrow 1735. The entry beam path 1715 is deflected (or displaced) below the optical axis 1710. The exit beam path 1740 may be deflected upwardly through the optical axis 1715 by the deflection lens assembly 1712.

In FIG. 13C at 1760, the wedge 1705 is moved downward as indicated by arrow 1765. The entry beam path 1715 is deflected above the optical axis 1710. The exit beam path 1770 may be deflected downwardly through the optical axis 1715 by the deflection lens assembly 1712.

FIG. 14 schematically illustrates an embodiment 1800 having separate transmit path and receive path, and a mixer (or splitter) 1825 where the transmit path and the receive path are merged to form a measurement beam. A transmit path extends from an EDM 505 along a path 1805 to a deflection module 515, then with deflection along a path 1810 via optional mirrors 1815 and 1820 to the mixer 1825 (or mixing point of the mixer), then via a front lens assembly 525 along a path 1830. A receive path extends from the path 1830 through the front lens assembly 525 to the mixer 1825, then via a mirror 1835 along a path 1840 to the deflection module 515, then as deflected along a path 1845 to the EDM 505. The mirrors are shown by way of example; mirrors may be placed in the transmit path and/or in the receive path or in neither as a matter of design choice. Without any mirror, the transmit path and the receive path would follow different directions, e.g. two directions perpendicular to each other as defined by the optical property of the splitter including the mixer 1825. In some embodiments, it could therefore be envisaged that the deflection module comprises two deflection elements, one arranged in the transmit path and one arranged in the receive path. The transmitter and the receiver of the EDM could also be arranged separately from each other.

The transmit path segment from the mixer 1825 through the front lens assembly 525 along the path 1830 to a target overlaps with the receive path segment from the target along path 1830 through the front lens assembly 525 to the mixer 1825. The combination of these overlapping segments of the transmit path and the receive path forms a measurement beam.

As will be illustrated in more detail with reference to FIGS. 15-19, the mixing point 1825 may be a splitting point or a point located in a splitter configured to split a beam in two paths. In the present embodiment, the beam 1830 in which the transmitted optical radiation and the reflected optical radiation travel is split into a transmit path and a receive path.

FIG. 15 illustrates at 1900 the concept of a measurement beam 1905. Transmit path segment 1910 (e.g., along path 1830 of FIG. 14) toward target 1915 overlaps with receive path segment 1920 (e.g., along path 1830 of FIG. 14). Light transmitted from the instrument 1925 and any portion of light reflected from a target 1915 received by the instrument 1925 form a measurement beam 1905.

FIG. 16 further illustrates at 2000 an example of a measurement beam 2005. Light transmitted from an instrument 2010 along a transmit path segment shown by arrow 2015 and light reflected from a target and received by the instrument 2010 along a receive path segment shown by arrows 2020 and 2025 form the measurement beam 2005.

In some embodiments, the instrument may be equipped with a front lens assembly having an optical axis, thereby creating a focal point of the instrument at a certain distance from the front lens. The mixer (or splitter) may lie along the optical axis of the front lens assembly between a rear lens surface of the front lens assembly and the deflection element at a distance from the rear lens surface of less than the distance to the focal point.

In some embodiments, the distance measurement module may include an optical detector (denoted 507 in FIG. 5) at an optical reception point in the receive path, located approximately at the focal point of the front lens assembly (or focal point of the instrument in case other optical elements affect the position of the focal point) along the receive path. In some embodiments, the distance measurement module may include an optical transmitter (denoted 506 in FIG. 5) at an optical transmission point in the transmit path, located approximately at the focal point of the front lens assembly (or focal point of the instrument) along the transmit path.

FIG. 17 schematically illustrates axes of a measurement instrument 2100. A center unit 2105 has an instrument optical axis 2110. The center unit 2105 is mounted on an alidade 2115 for rotation about a first (trunnion) axis 2120. The alidade 2115 is mounted on a base 2125 for rotation about a second (azimuthal) axis 2130 intersecting (e.g. orthogonal to) the first (trunnion) axis 2120, such that the instrument optical axis is rotatable about a rotation point.

FIG. 18A is a schematic illustration at 2200 of a measurement apparatus having a distance measurement module 2202, a deflection module 2204, mirrors 2206, 2208 and 2230, a mixer 2210, and a front lens assembly 2212. The nominal, non-deflected transmit path is indicated by dashed lines 2214 and 2216. The nominal, non-deflected receive path is indicated by dashed lines 2214 and 2218. Light signals from an optical transmission point of the distance measurement module 2202 follow the transmit path segment 2220 to the deflection module 2204. The transmit path is deflected from the nominal path 2216, 2214 by the deflection module 2204 as indicated by the deflected transmit path segments 2222, 2224, 2226 and 2228.

Return light signals from a target (not shown) follow a path 2228 to the mixer 2210 via the front lens assembly 2212, and then follow receive path segments 2232 and 2234 to the deflection module 2204 and receive path segment 2236 to an optical reception point of the distance measurement module 2202.

In the example of FIG. 18A, both the transmit path and the receive path are deflected about a deflection point at the mixer 2210.

FIG. 18B shows at 2250 the measurement apparatus of FIG. 18A, with the transmit path and the receive path deflected in the opposite direction. Light signals from the EDM 2202 follow a transmit path segment 2220 to the deflection module 2204. The transmit path is deflected from the nominal path 2216, 2214 by the deflection module 2204 as indicated by deflected transmit path segments 2268, 2270, 2272 and 2274.

Return light signals from a target (not shown) follow the path 2274 to the mixer 2210 via the front lens assembly 2212, and then follow receive path segments 2278 and 2280 to the deflection module 2204 and receive path segment 2236 to the EDM 2202.

FIG. 19 shows a measurement system 2300 having an integrated tracking module in accordance with some embodiments. Light signals from a distance measurement module 2305 follow a transmit path segment 2310 to a deflection module 2315. The transmit path is deflected from the nominal path by the deflection module 2315 between deflection limits 2320, 2325 as indicated by arrow 2330. The light signals emitted from the deflection module 2315 pass through a beam splitter 2335. Return light signals pass via the front lens assembly 2380 through the beam splitter 2335 to the deflection module 2315.

The beam splitter may for example be a chromatic beam splitter in that it reflects light of certain wavelength(s) or of a certain wavelength range while it is transparent to other wavelengths. For implementations with a chromatic beam splitter, the distance measurement module 2305 and the tracking module 2340 may use different wavelengths.

The tracker module 2340 emits a tracking light signal that passes along a path segment 2345 to the beam splitter 2335 and exits along a path segment 2350. The path segment 2350 is within the deflection limits 2320, 2325 and generally coaxial with the measurement beam. The tracker module 2340 has a field of view defined by limits 2355, 2360 to enable tracking of a target.

FIG. 20 shows a block diagram of a tracking system 2400. The tracker module 2340 is located within the center unit of the instrument, such as within the center unit (or telescope assembly) 2105 of FIG. 17. The tracker module 2340 emits a tracking light signal 2410 toward a target 2415 and receives a tracking return signal 2420, if any, from target 2415. The tracker module 2340 directs a servo control 2425 via control signals 2430 to activate servo drives 2435 as needed to maintain the optical axis of the center unit aimed toward the target, as indicated schematically by arrow 2440.

The tracker module 2340 includes a detection module operative to distinguish at least one specific target in the vicinity of the measurement instrument from other targets, and a servo control module responsive to the tracker module, such as servo control 2425 and servo drives 2435, is operative to aim the instrument optical axis such that the specific target is within a field of view of the distance measurement module.

FIG. 21 shows a measurement system 2500 having an integrated viewer module 2540 in accordance with some embodiments. Light signals from a distance measurement module 2505 follow a transmit path segment 2510 to a deflection module 2515. The transmit path is deflected from the nominal path by the deflection module 2515 between deflection limits 2520, 2525 as indicated by arrow 2530. The light signals emitted from deflection module 2515 pass through a beam splitter 2535 and a front lens assembly 2580. Return light signals pass via the front lens assembly 2580 through the beam splitter 2535 to the deflection module 2515.

As mentioned above in the embodiment described with reference to FIG. 19, the beam splitter 2535 may for example be a chromatic beam splitter. For example, the beam splitter may reflect the visible range while the distance measurement module 2505 operates in the invisible range. As another example, if the distance measurement module 2505 operates in the visible range, the beam splitter may reflect light in the visible range but with a notch letting visible light from (and/or to) the distance measurement module pass through.

The viewer module 2540 has an image axis that passes along a path segment 2545 to beam splitter 2535 and exits along a path segment 2550. The path segment 2550 is within the deflection limits 2520, 2525 and generally coaxial with the measurement beam. The viewer module 2540 has a field of view defined by limits 2555, 2560 to enable viewing of a target. In some embodiments, the viewer module 2540 is an optical eyepiece that allows a human operator to view the target substantially along the optical axis of the measurement beam. In some embodiments, the viewer module 2540 is a camera operative to capture a still image and/or a video of the target substantially along the optical axis of the measurement beam. In some embodiments, the camera drives a display that allows a human operator to view an image of the target along the optical axis of the measurement beam.

FIG. 22 schematically illustrates at 2600 the operation of a first type of mixer: a beam splitter 2605. An incoming beam along a path 2610 is split into a first exit beam along a path 2615 and a second exit beam along a path 2620. The beam splitter 2605 is a standard beam splitter on a glass plate, using either the reflection due to the transition from air to glass or a uniform coating to split the beam.

In some embodiments the glass plate has a partially reflective surface through which the transmitted optical radiation passes along a transmit path and which reflects optical radiation arriving via a receive path, or vice versa. In some embodiments the uniform coating has chromatic properties reflecting differently based on wavelength.

FIG. 23 schematically illustrates at 2700 the operation of a second type of mixer: a beam splitter 2705. The beam splitter 2705 is a glass plate having a surface coating with different degrees of reflectivity. A central region 2710 has a relatively lower degree of reflectivity than the surrounding annular region 2715. An incoming beam 2720 is split by passing a portion through the central region 2710 to provide a central exit beam 2725, and reflecting an annular portion defined by the diameter 2730 of incoming beam 2720 and by the diameter of the central region 2710 to divert an annular exit beam 2735. In some embodiments the areas with different reflectivity are reversed, with high reflectivity in the central region 2710 and relatively lower reflectivity in the annular region 2715. In some embodiments these coatings are chromatic, reflecting differently based on wavelength.

FIG. 24 schematically illustrates at 2800 the operation of a third type of mixer: a beam splitter 2805. The beam splitter 2805 is a cubic element having an internal reflective surface 2810 with uniform coating. A portion of an incoming beam 2815 arriving along an axis 2820 passes through the surface 2810 to form an exit beam 2825 along an axis 2820. Another portion of the incoming beam 2815 is reflected by the surface 2810 to form an exit beam 2830 along another axis 2835. In some embodiments the coating may be chromatic, reflecting differently based on wavelength.

FIG. 25 schematically illustrates at 2900 the operation of a fourth type of mixer: a beam splitter 2905. The beam splitter 2905 is a cubic element having an internal reflective surface 2910 with different degrees of reflectivity. A central region 2915 has a relatively lower degree of reflectivity than the surrounding annular region 2920. An incoming beam 2925 is split by passing a portion through the central region 2915 to provide a central exit beam 2930, and reflecting an annular portion defined by the diameter 2935 of the incoming beam 2925 and by the diameter of the central region 2915 to divert an annular exit beam 2940. In some embodiments, the areas with different reflectivity may be reversed, with high reflectivity in the central region 2915 and relatively lower reflectivity in the annular region. In some embodiments, these coatings may be chromatic, reflecting differently based on wavelength.

FIG. 26A shows at 3000 in perspective view a further mixer: a beam splitter 3005 for use as a mixing point (or splitting point) in accordance with some embodiments, for example as the mixer (or mixing point) 1825 of FIG. 14. The beam splitter 3005 is made up of a first glass block 3010 and a second glass block 3015. The glass block 3010 has a front surface 3020, a rear surface 3035, and a bottom surface at the interface with the front surface of glass block 3015. A partially reflective coating 3025 is provided at the interface between the bottom surface of glass block 3010 and the front surface of glass block 3015. The glass block 3015 has a rear surface 3030. The partially reflective coating 3025 may have a central region 3040 with a relatively lower degree of reflectivity than the surrounding annular region 3045; in some embodiments the relative reflectivities of regions 3040 and 3045 are reversed, or these regions may be arranged in any other desired configuration.

FIG. 26B schematically illustrates at 3060 the path of a transmit light beam 3062 through the beam splitter 3005 of FIG. 26A. A transmit light beam 3062 enters the glass block 3010 through front surface 3020 along path 3064. The transmit light beam 3602 is then reflected from the rear surface 3035 along a path 3066, from the front surface 3020 along a path 3068, and from the rear surface 3030 through the central region 3040 of surface 3025 to exit through the surface 3020 along a path 3070 as beam 3072.

FIG. 26C schematically illustrates at 3080 the path of a receive light beam through the beam splitter 3005 of FIG. 26A. A receive light beam 3082 enters the glass block 3010 through the front surface 3020 along a path 3084. The receive light beam is then reflected from the reflective annular region 3045 of a surface 3025 along a path 3086, from the front surface 3020 along a path 3088, and from the rear surface 3035 to exit through the surface 3020 along a path 3090 as beam 3092.

Comparison of FIG. 26B and FIG. 26C shows that the transmit light beam 3072 exiting the beam splitter 3005 and the receive light beam 3082 entering beam splitter 3005 are coaxial. However, the entry path 3064 of transmit light beam 3062 and the exit path 3090 of the receive light beam 3092 are parallel to and offset from one another, to facilitate simultaneous deflection of the transmit light signal and the receive light signal using a single deflection element. The center of the coating pattern on surface 3025 (i.e., the center of 3040 and 3045) will be the mixing point of this system, around which both of the transmit path and the receive path will be deflected.

FIG. 27A shows at 3100 a measurement instrument 3105 configured for vertical beam deflection and azimuthal sweep of the center unit in accordance with some embodiments. A center unit, such as a telescope assembly 3110, has a distance measurement module mounted on an alidade 3115 for rotation about a trunnion axis 3120. The alidade 3115 is rotatable about an azimuthal axis 3125 as indicated by arrow 3130. The azimuthal axis 3125 is substantially normal to an azimuthal plane. The measurement beam 3135 of the distance measurement module is nominally aligned with the center unit axis 3140, and is deflected between an upper angular limit 3145 and a lower angular limit 3150 as indicated by arrow 3155. The angular limits 3145 and 3150 define a plane passing through the center unit axis 3140 and substantially normal to the azimuthal plane.

Although not shown in detail in FIG. 27A, the center unit or telescope assembly 3110 of the measurement instrument 3105 includes a subsystem with a distance measurement module, a deflection module and a mixer/splitter such as the subsystem 500 described with reference to FIG. 5 or the subsystems 1800, 2200, 2250, 2300, 2500 described with reference to FIGS. 14, 18A, 18B, 19 and 21, respectively. With such subsystems, the measuring instrument 3105 may scan a scene as described in FIGS. 27B, 28B and 29B.

FIG. 27B shows at 3160 a pattern of measurements acquired with the instrument configuration of FIG. 27A. The measurement beam 3135 is repeatedly deflected relative to the center unit axis 3140 in the substantially vertical plane of arrow 3155, e.g. from the upper angular limit 3145 to the lower angular limit 3150, as distance measurements are acquired by operation of the distance measurement module.

With the center unit 3110 fixed about the trunnion axis 3120 and alidade 3115 fixed about the azimuthal axis 3125, each pass of the deflected measurement beam indicated by arrow 3165 would result in a sequence of measurements in a substantially vertical line.

However, simultaneously rotating the alidade 3115 about the azimuthal axis 3125 as indicated by arrow 3170 results in each measurement being offset relative to the preceding measurement by an azimuthal increment. Each vertical pass of the deflected measurement beam thus produces a non-vertical line of measurement positions, such as tilted line 3175.

Continuous deflection of the measurement beam 3135 and continuous rotation of the alidade 3115 results in a sequence of such lines 3175, 3180, etc., as represented by the array of dots in FIG. 27B. Each dot of the array represents a measurement of distance, elevation and azimuth to a respective target location. An azimuthal stripe of measurements is thus acquired, representing a 3D cloud of points. Each measurement optionally includes further information about the respective target location, such as return signal intensity (indicating albedo of the target surface).

FIG. 28A shows at 3200 a measurement instrument 3205 configured for vertical sweep of the center unit and beam deflection in a plane orthogonal to that of FIG. 27A, in accordance with some embodiments. A telescope assembly 3210 having a distance measurement module is mounted on an alidade 3215. The telescope assembly 3210 is rotatable about a trunnion axis 3220 as indicated by arrow 3225. The trunnion axis 3220 is substantially normal to an azimuthal axis of rotation 3230. The measurement beam of the distance measurement module is nominally aligned with the center unit axis 3240, and is deflected between angular limits 3245, 3250 lying in plane defined by the center unit axis 3240 and the trunnion axis 3220, as indicated by arrow 3255.

FIG. 28B shows at 3260 a pattern of measurements acquired with the instrument configuration of FIG. 28A. The measurement beam 3235 is repeatedly deflected relative to the center unit axis 3240 in the plane of arrow 3255 (defined by the trunnion axis 3220 and the center unit axis 3235), e.g. between angular limits 3245 and 3250, as distance measurements are acquired by operation of the distance measurement module.

With the alidade 3215 fixed about the azimuthal axis 3230 and the center unit 3210 fixed about the trunnion axis 3220 as shown in FIG. 28A, each pass of the deflected measurement beam indicated by arrow 3265 would result in a sequence of measurements in a substantially azimuthal line.

However, simultaneously rotating the center unit 3210 about the trunnion axis 3220 as indicated by arrow 3270 results in each measurement being offset relative to the preceding measurement by a substantially vertical increment. Each pass of the deflected measurement beam in the azimuthal plane thus produces a non-azimuthal line of measurement positions, such as tilted line 3275.

Continuous deflection of the measurement beam 3235 and continuous rotation of the center unit 3210 results in a sequence of such lines 3275, 3280, etc., as represented by the array of dots in FIG. 28B. Each dot of the array represents a measurement of distance, elevation and azimuth to a respective target location. A vertical stripe of measurements is thus acquired, representing a 3D cloud of points. The distance measurement module is optionally configured to acquire further information about each measured target location, such as return signal intensity (indicating albedo of the target surface).

FIG. 29A shows at 3300 a measurement instrument 3305 configured for beam deflection in a tilted plane with azimuthal and/or vertical sweep of the center unit in accordance with some embodiments. A center unit assembly 3310 having a distance measurement module is mounted on an alidade 3315 for rotation about a trunnion axis 3320 as indicated by arrow 3325. Alidade 3315 is rotatable about an azimuthal axis 3330 as indicated by arrow 3335. Azimuthal axis 3330 is substantially normal to an azimuthal plane. The measurement beam of the distance measurement module is nominally aligned with the center unit axis 3345, and is deflected between an upper angular limit 3350 and a lower angular limit 3355 as indicated by arrow 3360. Angular limits 3350 and 3355 define a plane, indicated at 3365, that is oblique to (tilted less than 90 degrees relative to) a plane defined by the trunnion axis 3320 and the center unit axis 3345. This tilt can be 30 degrees or 45 degrees or 60 degrees, or other desired angle.

FIG. 29B shows at 3370 a pattern of measurements acquired with the instrument configuration of FIG. 29A. The measurement beam is repeatedly deflected relative to the center unit axis 3345 in the plane of arrow 3360 and line 3365 (at a selected angle relative to the plane defined by the trunnion axis 3320 and the center unit axis 3345), e.g. between angular limits 3350 and 3355, as distance measurements are acquired by operation of the distance measurement module.

With the alidade 3315 fixed about the azimuthal axis 3330 and the center unit 3310 fixed about the trunnion axis 3320 as shown in FIG. 29A, each pass of the deflected measurement beam indicated by arrow 3375 would result in a sequence of measurements in a line of the tilted plane of arrow 3360 and line 3365.

However, simultaneously rotating the center unit 3310 about the trunnion axis 3320 as indicated by arrow 3380 results in each measurement being offset relative to the preceding measurement by a substantially vertical increment. Each pass of the deflected measurement beam in the tilted plane of arrow 3360 and line 3365 thus produces a line of measurement positions that is tilted still further, such as tilted line 3385.

Continuous deflection of the measurement beam and continuous rotation of the center unit 3310 results in a sequence of such lines 3385, 3390, etc., as represented by the array of dots in FIG. 29B. Each dot of the array represents a measurement of distance, elevation and azimuth to a respective target location. A vertical stripe of measurements is thus acquired, representing a 3D cloud of points. The distance measurement module is optionally configured to acquire further information about each measured target location, such as return signal intensity (indicating albedo of the target surface).

The example of FIG. 29B illustrates continuous deflection of the measurement beam 3340 and continuous rotation of the center unit 3310 about the trunnion axis 3320 while the alidade 3315 remains fixed about the azimuthal axis 3330.

Alternatively, the measurement beam 3340 is continuously deflected while the alidade 3315 is rotated about the azimuthal axis 3330 and the center unit remains fixed about the trunnion axis 3320. In this mode of operation, an azimuthal stripe of measurements is acquired, representing a 3D cloud of point.

In each of the examples of FIG. 27A, FIG. 27B, FIG. 28A, FIG. 28B, FIG. 29A and FIG. 29B, the deflection rate and rotation rate may be controlled as needed to obtain a desired density of measurements in a two-dimensional polar grid, such as measurements at a selected angular spacing. The deflection rate may be controlled, for example, by the controller 555 of the subsystem 500 as shown in FIG. 5. The rotation rate is controlled, for example, by servo drives 2435 as shown in FIG. 20 responsive to a servo controller 2425.

In some embodiments, a first controllable drive rotates the center unit about a first axis, a second controllable drive rotates the alidade about a second axis, and a synchronizer is operative to synchronize operation of the first controllable drive, the second controllable drive, the deflection module and the distance measurement unit so as to obtain a grid of distance measurements having a selected angular spacing.

A measurement instrument as illustrated in any of FIG. 27A, FIG. 28A or FIG. 29A can be operated in a first mode, as a total station to acquire individual point measurements without sweeping or deflecting (e.g., with the respective measurement beam 3135, 3235, 3340 fixed relative to the center unit axis and with the center unit and alidade fixed about their respective axes of rotation for a given measurement), or in a second mode, to acquire measurement stripes such as described above.

Although the present invention has been described with reference to detailed examples, the detailed examples only serve to provide the skilled person with a better understanding, and are not intended to limit the scope of the invention. The scope of the invention is much rather defined by the appended claims.

For example, although it has been shown in the above embodiments that a deflection of the measurement path across the instrument optical axis may be achieved by a mechanical displacement or rotation of a deflection element, a deflection of the measurement path may be obtained without any mechanical motion, and in particular without rotating or moving any part(s) of the instrument or any deflection element. The deflection of the measurement path may be achieved using a deflection element based on electro-optical effect wherein an optical property (or characteristic) of a deflection element, such as its refractive index, or even its shape, may be altered by appliance of an electrical bias (voltage) upon the deflection element.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A measurement instrument, comprising:
a distance measurement module comprising an optical radiation transmitter operative to transmit optical radiation along a transmit path and an optical radiation detector operable to receive optical radiation along a receive path,
a splitter at which the transmit path and the receive path are merged in a measurement beam, and
a deflection module located optically between the splitter and both the optical radiation transmitter and the optical radiation detector of the distance measurement module, wherein the deflection module comprises an optically transparent structure and is operative to aim the transmit path and the receive path at the splitter and to deflect at least one of the transmit path and the receive path across an instrument optical axis.

2. The instrument of claim 1, wherein the deflection module comprises at least one deflection element mounted for rotational motion and/or translational displacement such that at least one of the transmit path and the receive path is displaced with rotation and/or translational displacement of the deflection element.

3. The instrument of claim 2, further comprising a drive element operative to rotate and/or translate the at least one deflection element.

4. The instrument of claim 3, wherein the drive element is operative to produce at least one of an oscillating rotational motion of the at least one deflection element, a continuous rotational motion of the at least one deflection element, a directed rotational motion of the at least one deflection element to a selected orientation, and a translational displacement of the at least one deflection element.

5. The instrument of claim 3, wherein the drive element comprises at least one of a motor having constant rotational speed, a three-phase motor, a direct-current motor, and a piezoelectric element.

6. The instrument of claim 2, further comprising an angle sensor operative to detect an angle of rotation of the at least one deflection element and/or a displacement sensor operative to detect a translational displacement of the at least one deflection element.

7. The instrument of claim 3, further comprising a drive controller operative to control rotational motion and/or translational displacement of the at least one deflection element by the drive element.

8. The instrument of claim 7, wherein the drive controller is responsive to an angle sensor and/or a displacement sensor to control the drive element in dependence upon a rotation angle and/or a translational displacement of the at least one deflection element.

9. The instrument of claim 1, wherein the deflection module includes at least one deflection element comprising at least one of a prism, a multifaceted mirror and a disk having a scalloped curving mirrored surface.

10. The instrument of claim 1, wherein the deflection module is operative to displace the transmit path, and wherein the instrument further comprises a deflection lens assembly in the transmit path, whereby displacement of the transmit path is converted to angular deflection across the optical axis.

11. The instrument of claim 1, wherein the deflection module is operative to displace the receive path, and wherein the instrument further comprises a deflection lens assembly in the receive path, whereby displacement of the receive path is converted to angular deflection across the optical axis.

12. The instrument of claim 1, further comprising a front lens assembly having an optical axis, thereby creating a focal point of the instrument at a certain distance from the front lens, wherein the splitter lies along the optical axis of the front lens assembly between the front lens assembly and a deflection element of the deflection module at a distance from the front lens assembly of less than the distance to the focal point.

13. The instrument of claim 12, wherein the distance measurement module comprises an optical detector in the receive path, located approximately at the focal point of the instrument along the receive path, and/or wherein the distance measurement module comprises an optical transmitter in the transmit path, located approximately at the focal point of the instrument along the transmit path.

14. The instrument of claim 1, wherein the distance measurement module further comprises a center unit, an alidade, and a base, wherein the optical transmission point, the optical reception point, the splitter and the deflection module are located in the center unit.

15. The instrument of claim 1, wherein the splitter comprises a partially reflective surface through which the transmitted optical radiation passes along the transmit path and which reflects optical radiation arriving via the receive path and/or wherein the splitter comprises a partially reflective surface through which passes the optical radiation arriving via the receive path, and which reflects optical radiation transmitted along the transmit path.

16. The instrument of claim 15, wherein the partially reflective surface is within a beam-splitter prism and/or is a surface of an optical element.

* * * * *